(12) United States Patent
Boca

(10) Patent No.: US 8,559,699 B2
(45) Date of Patent: Oct. 15, 2013

(54) METHODS AND APPARATUS TO FACILITATE OPERATIONS IN IMAGE BASED SYSTEMS

(75) Inventor: Remus Boca, North Vancouver (CA)

(73) Assignee: RoboticVISIONTech LLC, Great Falls, VA (US)

( * ) Notice: Subject to any disclaimer, the term of this patent is extended or adjusted under 35 U.S.C. 154(b) by 1055 days.

(21) Appl. No.: 12/249,658

(22) Filed: Oct. 10, 2008

(65) Prior Publication Data

US 2010/0092032 A1    Apr. 15, 2010

(51) Int. Cl.
*G06K 9/00*    (2006.01)

(52) U.S. Cl.
USPC .......................................................... 382/153

(58) Field of Classification Search
USPC .................... 382/153; 348/113; 700/245, 264
See application file for complete search history.

(56) References Cited

U.S. PATENT DOCUMENTS

| | | | |
|---|---|---|---|
| 3,986,007 A | 10/1976 | Ruoff, Jr. | |
| 4,011,437 A | 3/1977 | Hohn | |
| 4,146,924 A | 3/1979 | Birk et al. | |
| 4,187,454 A | 2/1980 | Ito et al. | |
| 4,219,847 A | 8/1980 | Pinkney et al. | |
| 4,294,544 A | 10/1981 | Altschuler et al. | |
| 4,305,130 A | 12/1981 | Kelley et al. | |
| 4,334,241 A | 6/1982 | Kashioka et al. | |
| 4,402,053 A | 8/1983 | Kelley et al. | |
| 4,437,114 A | 3/1984 | LaRussa | |
| 4,523,809 A | 6/1985 | Taboada et al. | |
| 4,578,561 A | 3/1986 | Corby, Jr. et al. | |
| 4,613,942 A | 9/1986 | Chen | |
| 4,654,949 A | 4/1987 | Pryor | |
| 4,687,325 A | 8/1987 | Corby, Jr. | |
| 4,791,482 A | 12/1988 | Barry et al. | |
| 4,835,450 A | 5/1989 | Suzuki | |
| 4,871,252 A | 10/1989 | Beni et al. | |
| 4,879,664 A | 11/1989 | Suyama et al. | |
| 4,904,996 A | 2/1990 | Fernandes | |
| 4,942,539 A | 7/1990 | McGee et al. | |
| 4,985,846 A | 1/1991 | Fallon | |
| 5,014,183 A | 5/1991 | Carpenter et al. | |
| 5,083,073 A | 1/1992 | Kato | |
| 5,160,977 A | 11/1992 | Utsumi | |
| 5,208,763 A | 5/1993 | Hong et al. | |

(Continued)

FOREIGN PATENT DOCUMENTS

DE    19515949 A1    11/1996
DE    102 36 040 A1    2/2004

(Continued)

OTHER PUBLICATIONS

"3D Robot Guidance with a Single Camera," ISRA Vision Systems AG, pp. 83-105. (No date available.).

(Continued)

*Primary Examiner* — Edward Park
(74) *Attorney, Agent, or Firm* — Seed IP Law Group PLLC

(57) ABSTRACT

Vision based systems may select actions based on analysis of images to redistribute objects. Actions may include action type, action axis and/or action direction. Analysis may determine whether an object is accessible by a robot, whether an upper surface of a collection of objects meet a defined criteria and/or whether clusters of objects preclude access.

25 Claims, 9 Drawing Sheets

(56) References Cited

U.S. PATENT DOCUMENTS

| | | | |
|---|---|---|---|
| 5,212,738 | A | 5/1993 | Chande et al. |
| 5,300,869 | A | 4/1994 | Skaar et al. |
| 5,325,468 | A | 6/1994 | Terasaki et al. |
| 5,350,269 | A | 9/1994 | Azuma et al. |
| 5,446,835 | A | 8/1995 | Iida et al. |
| 5,454,775 | A | 10/1995 | Cullen et al. |
| 5,461,478 | A | 10/1995 | Sakakibara et al. |
| 5,499,306 | A | 3/1996 | Sasaki et al. |
| 5,521,830 | A | 5/1996 | Saito |
| 5,523,663 | A | 6/1996 | Tsuge et al. |
| 5,568,593 | A | 10/1996 | Demarest et al. |
| 5,579,444 | A | 11/1996 | Dalziel et al. |
| 5,608,818 | A | 3/1997 | Chini et al. |
| 5,621,807 | A | 4/1997 | Eibert et al. |
| 5,633,676 | A | 5/1997 | Harley et al. |
| 5,645,248 | A | 7/1997 | Campbell |
| 5,696,673 | A | 12/1997 | Pryor |
| 5,715,166 | A | 2/1998 | Besl et al. |
| 5,745,523 | A | 4/1998 | Dent et al. |
| 5,784,282 | A | 7/1998 | Abitbol et al. |
| 5,802,201 | A | 9/1998 | Nayar et al. |
| 5,809,006 | A | 9/1998 | Davis et al. |
| 5,870,527 | A | 2/1999 | Fujikawa et al. |
| 5,956,417 | A | 9/1999 | Pryor |
| 5,959,425 | A | 9/1999 | Bieman et al. |
| 5,974,169 | A | 10/1999 | Bachelder |
| 5,978,521 | A | 11/1999 | Wallack et al. |
| 5,988,862 | A | 11/1999 | Kacyra et al. |
| 6,004,016 | A | 12/1999 | Spector |
| 6,044,183 | A | 3/2000 | Pryor |
| 6,064,759 | A | 5/2000 | Buckley et al. |
| 6,079,862 | A | 6/2000 | Kawashima et al. |
| 6,081,370 | A | 6/2000 | Spink |
| 6,115,480 | A | 9/2000 | Washizawa |
| 6,141,863 | A | 11/2000 | Hara et al. |
| 6,167,607 | B1 | 1/2001 | Pryor |
| 6,173,066 | B1 | 1/2001 | Peurach |
| 6,211,506 | B1 | 4/2001 | Pryor et al. |
| 6,236,896 | B1 | 5/2001 | Watanabe et al. |
| 6,246,468 | B1 | 6/2001 | Dimsdale |
| 6,278,906 | B1 | 8/2001 | Piepmeier et al. |
| 6,301,763 | B1 | 10/2001 | Pryor |
| 6,328,523 | B1 * | 12/2001 | Watanabe et al. ........ 414/416.01 |
| 6,341,246 | B1 | 1/2002 | Gerstenberger et al. |
| 6,392,744 | B1 | 5/2002 | Holec |
| 6,424,885 | B1 | 7/2002 | Niemeyer et al. |
| 6,463,358 | B1 | 10/2002 | Watanabe et al. |
| 6,466,843 | B1 | 10/2002 | Bonanni et al. |
| 6,490,369 | B1 | 12/2002 | Beiman |
| 6,516,092 | B1 | 2/2003 | Bachelder et al. |
| 6,529,627 | B1 | 3/2003 | Callari et al. |
| 6,546,127 | B1 | 4/2003 | Seong et al. |
| 6,549,288 | B1 | 4/2003 | Migdal et al. |
| 6,560,513 | B2 | 5/2003 | Krause et al. |
| 6,580,971 | B2 | 6/2003 | Bunn et al. |
| 6,594,600 | B1 | 7/2003 | Arnoul et al. |
| 6,628,819 | B1 | 9/2003 | Huang et al. |
| 6,668,082 | B1 | 12/2003 | Davison et al. |
| 6,721,444 | B1 | 4/2004 | Gu et al. |
| 6,724,930 | B1 | 4/2004 | Kosaka et al. |
| 6,728,582 | B1 | 4/2004 | Wallack |
| 6,741,363 | B1 | 5/2004 | Kaupert |
| 6,748,104 | B1 | 6/2004 | Bachelder et al. |
| 6,754,560 | B2 | 6/2004 | Fujita et al. |
| 6,804,416 | B1 | 10/2004 | Bachelder et al. |
| 6,816,755 | B2 | 11/2004 | Habibi et al. |
| 6,836,567 | B1 | 12/2004 | Silver et al. |
| 6,836,702 | B1 | 12/2004 | Brogårdh et al. |
| 6,841,780 | B2 | 1/2005 | Cofer et al. |
| 6,853,965 | B2 | 2/2005 | Massie et al. |
| 6,898,484 | B2 | 5/2005 | Lemelson et al. |
| 6,970,802 | B2 | 11/2005 | Ban et al. |
| 6,985,620 | B2 | 1/2006 | Sawhney et al. |
| 7,003,616 | B2 | 2/2006 | Shimura |
| 7,006,236 | B2 | 2/2006 | Tomasi et al. |
| 7,009,717 | B2 | 3/2006 | Van Coppenolle et al. |
| 7,024,280 | B2 | 4/2006 | Parker et al. |
| 7,061,628 | B2 | 6/2006 | Franke et al. |
| 7,084,900 | B1 | 8/2006 | Watanabe et al. |
| 7,085,622 | B2 | 8/2006 | Sadighi et al. |
| 7,087,049 | B2 | 8/2006 | Nowlin et al. |
| 7,151,848 | B1 | 12/2006 | Watanabe et al. |
| 7,177,459 | B1 | 2/2007 | Watanabe et al. |
| 7,181,083 | B2 | 2/2007 | Dell'Eva |
| 7,233,841 | B2 | 6/2007 | Sadighi et al. |
| 7,313,464 | B1 * | 12/2007 | Perreault et al. .............. 700/245 |
| 7,336,814 | B2 | 2/2008 | Boca et al. |
| 7,424,341 | B2 | 9/2008 | Watanabe et al. |
| 7,627,395 | B2 | 12/2009 | Sadighi et al. |
| 7,657,065 | B2 | 2/2010 | Kotake et al. |
| 7,693,325 | B2 | 4/2010 | Pulla et al. |
| 7,720,573 | B2 | 5/2010 | Yamada et al. |
| 7,742,635 | B2 | 6/2010 | Rohaly et al. |
| 7,796,276 | B2 | 9/2010 | Schipke et al. |
| 7,916,935 | B2 | 3/2011 | Larsen et al. |
| 7,957,583 | B2 | 6/2011 | Boca et al. |
| 8,095,237 | B2 | 1/2012 | Habibi et al. |
| 2001/0034481 | A1 | 10/2001 | Horn |
| 2001/0055069 | A1 | 12/2001 | Hudson |
| 2002/0019198 | A1 | 2/2002 | Kamono |
| 2002/0028418 | A1 | 3/2002 | Farag et al. |
| 2002/0156541 | A1 | 10/2002 | Yutkowitz |
| 2002/0159628 | A1 | 10/2002 | Matusik et al. |
| 2003/0004694 | A1 | 1/2003 | Aliaga et al. |
| 2003/0007159 | A1 | 1/2003 | Franke et al. |
| 2003/0182013 | A1 | 9/2003 | Moreas et al. |
| 2003/0202691 | A1 | 10/2003 | Beardsley |
| 2003/0234349 | A1 | 12/2003 | Wootton et al. |
| 2004/0037689 | A1 | 2/2004 | Watanabe et al. |
| 2004/0041808 | A1 | 3/2004 | Ban et al. |
| 2004/0073336 | A1 | 4/2004 | Huang et al. |
| 2004/0080758 | A1 | 4/2004 | Ban et al. |
| 2004/0081352 | A1 | 4/2004 | Ban et al. |
| 2004/0114033 | A1 | 6/2004 | Eian et al. |
| 2004/0168148 | A1 | 8/2004 | Goncalves et al. |
| 2004/0172164 | A1 | 9/2004 | Habibi et al. |
| 2004/0190775 | A1 | 9/2004 | Miller |
| 2004/0193321 | A1 | 9/2004 | Anfindsen et al. |
| 2004/0233461 | A1 | 11/2004 | Armstrong et al. |
| 2004/0243282 | A1 | 12/2004 | Watanabe et al. |
| 2005/0002555 | A1 | 1/2005 | Kumiya et al. |
| 2005/0065653 | A1 | 3/2005 | Ban et al. |
| 2005/0097021 | A1 | 5/2005 | Behr et al. |
| 2005/0103930 | A1 | 5/2005 | Silansky et al. |
| 2005/0126833 | A1 | 6/2005 | Takenaka et al. |
| 2005/0233816 | A1 | 10/2005 | Nishino et al. |
| 2005/0246053 | A1 | 11/2005 | Endou et al. |
| 2005/0273202 | A1 | 12/2005 | Bischoff |
| 2006/0025874 | A1 | 2/2006 | Huffington et al. |
| 2006/0088203 | A1 | 4/2006 | Boca et al. |
| 2006/0119835 | A1 | 6/2006 | Rastegar et al. |
| 2006/0210112 | A1 | 9/2006 | Cohen et al. |
| 2007/0032246 | A1 | 2/2007 | Feher |
| 2007/0073439 | A1 | 3/2007 | Habibi et al. |
| 2007/0075048 | A1 | 4/2007 | Kunisaki et al. |
| 2007/0235583 | A1 | 10/2007 | Palmer |
| 2007/0276539 | A1 | 11/2007 | Habibi et al. |
| 2008/0069435 | A1 | 3/2008 | Boca et al. |
| 2008/0144884 | A1 | 6/2008 | Habibi |
| 2008/0181485 | A1 | 7/2008 | Beis et al. |
| 2009/0254217 | A1 * | 10/2009 | Pack et al. ..................... 700/246 |
| 2010/0017033 | A1 | 1/2010 | Boca |
| 2010/0040255 | A1 | 2/2010 | Rhoads |

FOREIGN PATENT DOCUMENTS

| | | | |
|---|---|---|---|
| EP | 0 114 505 A1 | 8/1984 | |
| EP | 151417 A1 | 8/1985 | |
| EP | 493612 B1 | 7/1992 | |
| EP | 0763406 A1 | 3/1997 | |
| EP | 911603 A1 | 4/1999 | |
| EP | 951968 A2 | 10/1999 | |
| EP | 1 043 126 A2 | 10/2000 | |
| EP | 1 043 642 A2 | 10/2000 | |

(56) References Cited

FOREIGN PATENT DOCUMENTS

| EP | 1 043 689 A2 | 10/2000 |
|---|---|---|
| EP | 1172183 A2 | 1/2002 |
| EP | 1345099 A2 | 9/2003 |
| EP | 1 484 716 A1 | 12/2004 |
| JP | 63288683 A | 11/1988 |
| JP | 1-124072 A | 5/1989 |
| JP | 07311610 | 11/1995 |
| JP | 10049218 | 2/1998 |
| JP | 2000024973 A | 1/2000 |
| JP | 2002018754 | 1/2002 |
| WO | 9806015 A1 | 2/1998 |
| WO | 0106210 A1 | 1/2001 |
| WO | 2005/074653 A2 | 8/2005 |

OTHER PUBLICATIONS

3D Vision with One Camera, URL=http://neu.isravision.com/likecms/index.php?site=site.html&dir=isra&nav=162, download date Apr. 12, 2005.
Aloimonos, J., et al., "Active Vision," IEEE, pp. 35-54, 1987.
Anonymous, "Precise Length Measurement at VSM (Vereinigte Schmirgel-Und Maschinen-Fabriken AG)," News of the Astech GMBH 2001(4), Dec. 31, 2001.
Bajcsy, R., "Active Perception," Proc. IEEE 76(8):996-1005, 1988.
Bakhtari, A., et al., "Active-Vision-Based Multi-Sensor Surveillance—An Implementation," IEEE Transactions on Systems, Man and Cybernetics, Part C: Applications and Reviews, 36(5):668-680, Sep. 2006.
Beis, et al. "Indexing Without Invariants in 3D Object Recognition," IEEE Trans. On Pattern Analysis and Machine Intelligence, 21(10):1000-1015, 1999.
Bejczy, A. K., "Challenges of Human-Robot Communication in Telerobotics," IEEE International Workshop on Robot and Human Communication, pp. 1-8, Nov. 11-14, 1996.
Borotschnig, H., et al., "Active Object Recognition in Parametric Eigenspace," Proc. 9th British Machine Vision Conference, pp. 629-638, 1998.
Borotschnig, H., et al., "Appearance-Based Active Object Recognition," Image and Vision Computing, 18:715-727, 2000.
Bouthemy, P., "A Maximum Likelihood Framework for Determining Moving Edges," IEEE Trans. Pattern Analysis and Machine Intelligence, 11(5):499-511, 1989.
Brandner, "Uncertainty Estimation in a Vision-Based Tracking System," Proc. Int'l Workshop on Advanced Methods for Uncertainty Estimation in Measurement, pp. 40-45, Apr. 2006.
Brown, M., et al., "3D Model Acquisition by Tracking 2D Wireframes," Proc. 11th British Machine Vision Conference, pp. 656-665, 2000.
Callari F., et al., "Active Recognition: Using Uncertainty to Reduce Ambiguity," IEEE Proc. 13th International Conference on Pattern Recognition, pp. 925-929, 1996.
Chandrashaker et al., "Robotics and Structural Dynamics Characterization of the Space Station Remote Manipulator System Using Photogrammetric Techniques," IEEE, pp. 691-694, 1994.
Chaumette, F., "Potential problems of stability and convergence in image-based and position-based visual servoing," in D. Kriegman, G. Hager and A. Morse, editors, The Confluence of Vision and Control, 237:66-78, Springer-Verlag, 1998.
Chaumette, F., et al., "Structure from Controlled Motion," IEEE Trans. Pattern Analysis, May 1996.
Chen, L., et al., "An investigation on the accuracy of three-dimensional space reconstruction using the Direct Linear Transformation Technique," J. Biomechanics 27(4):493-500, 1994.
Constantinescu, D., et al., "Smooth and Time-Optimal Trajectory Planning for Industrial Manipulators along Specified Paths," Journal of Robotic Systems, 17(5):233-249, 2000.
Corke, P.I., et al., "A new partitioned approach to image-based visual servo control," IEEE Trans. On Robotics and Automation, 17(4):507-515, Aug. 2001.
Crowley et al., "Maintaining Stereo Calibration by Tracking Image Points," IEEE, pp. 483-488, 1993.
Deguchi, K., "Optimal motion control for image-based visual servoing by decoupling translation and rotation," Proc. Int. Conf. Intelligent Robots and Systems, pp. 705-711, Oct. 1998.
Denzler, J., et al., "Learning, Tracking and Recognition of 3D Objects," Proceedings of the International Conference on Intelligent Robots and Systems (IROS), XP000512662, 1:89-96, Munich, Sep. 12, 1994.
Drummond, T., et al., "Real-time Tracking of Complex Structures with On-line Camera Calibration," Proceedings of British Machine Vision Conference, pp. 574-583, 1999.
Eriksen, R.D., et al., "Classification and pose estimation of unconstrained 3D objects," 34th International Symposium on Robotics, Jun. 2-5, 2003, 7 pages.
Feddema et al., "Vision-Guided Servoing with Feature-Based Trajectory Generation," IEEE Trans. On Robotics and Automation 5(5):691-700, Oct. 1989.
Hartley et al., Multiple View Geometry in Computer Vision, Cambridge University Press, Cambridge, 2000.
Holliday et al., "Demonstration of Automated Robotic Workcell for Hazardous Waste Characterization," Proceedings of the International Conference on Robotics and Automation 3(10):788-794, May 2, 1993.
Huang, T., et al., "Uniqueness of 3D Pose Under Weak Perspective: A Geometrical Proof," IEEE Transactions on Pattern Analysis and Machine Intelligence, 17(12):1220-1221, Dec. 1995.
Hutchinson, S.A., et al., "Planning Sensing Strategies in a Robot Work Cell with Multi-Sensor Capabilities," IEEE Trans. Robotics and Automation 5(6):765-783, Dec. 1989.
Hutchison et al., "A Tutorial on Visual Servo Control," IEEE Transactions on Robotics and Automation 12(5), Oct. 1996.
Jensfelt et al., "Active Global Localization for a Mobile Robot Using Multiple Hypothesis Tracking," IEEE Trans. On Robotics and Automation 17(5):748-460, Oct. 2001.
Ji, Q., et al., "An Integrated Linear Technique for Pose Estimation from Different Geometric Features," International Journal of Pattern Recognition and Artificial Intelligence, 13(5):705-733, Aug. 1999.
Jia, Y-B., et al., "Sensing Polygon Poses by Inscription," in Proceedings of 1994 IEEE International Conference on Robotics and Automation, Los Alamitos, CA, May 8, 1994, pp. 1642-1649.
Kim, W., "Computer Vision Assisted Virtual Reality Calibration," URL= http://www-robotics.jpl.nasa.gov/publications/Won_Kim/ra98_vrc.pdf, Jun. 1999.
Kovacic, S., et al., "Planning Sequences of Views for 3-D Object Recognition and Pose Determination," Pattern Recognition, 31(10):1407-1417, 1998.
Liu, Y., et al., "Determination of Camera Location from 2D to 3D Line and Point Correspondences", IEEE Transaction on Pattern Analysis and Machine Intelligence, 12(1):82-88, Jan. 1990.
Lowe, D.G., "Robust Model-based Motion Tracking Through the Integration of Search and Estimation," International Journal of Computer Vision 8(2):113-122, 1992.
Lu, C-P., et al., "Fast and Globally Convergent Pose Estimation from Video Images," Transactions on Pattern Analysis and Machine Intelligence, 22(6):610-622, Jun. 2000.
Macfarlane, S., et al., "Jerk-Bounded Manipulator Trajectory Planning: Design for Real-Time Applications," IEEE Trans. Robotics and Automation 19(1):42-52, Feb. 2003.
Marjanovic et al., "Self-Taught Visually-Guided Pointing for a Humanoid Robot," XP-002220054, pp. 35-44, 1996.
Meyer, W.,"One-Eyed Robots With 3D Vision," ISRA Vision Systems AG, Press News, Release No. 16, Jun. 15, 2004, pp. 1-7.
Miura, J., et al., "Task-Oriented Generation of Visual Sensing Strategies in Assembly Tasks," CMU School of Computer Science Tech Report CMU-CS-95-116, pp. 1-39, Feb. 1995.
Motai, Y., et al., "Concatenate Feature Extraction for Robust 3D Elliptic Object Localization," Proc. Of the 19th ACM Symposium on Applied Computing, pp. 21-28, 2004.
Murase, H., et al., "Visual Learning and Recognition of 3-D Objects from Appearance," International Journal of Computer Vision, 14(1):5-24, 1995.

(56) References Cited

OTHER PUBLICATIONS

Naish, M., et al., "Coordinated dispatching of proximity sensors for the surveillance of manoeuvring targets," Journal of Robotics and Computer Integrated Manufacturing, 19(3):283-299, 2003.

Nelson et al., "Robotic Visual Servoing and Robotic Assembly Tasks," IEEE Robotics & Automation Magazine 3(2):23-31, Jun. 1996.

Nomura et al., "Integrated Visual Servoing System to Grasp Industrial Parts Moving on Conveyer by Controlling 6D0F Arm," Systems, Man, and Cybernetics, 2000 IEEE International Conference 3:1768-1775, Oct. 2000.

Papanikolopoulos et al., "Six Degree-of-Freedom Hand/Eye Visual Tracking with Uncertain Parameters," IEEE Transactions on Robotics and Automation 11(5):725-732, Oct. 1995.

Safaee-Rad et al., "Three-Dimensional Location Estimation of Circular Features for Machine Vision," IEEE, pp. 624-640, 1992.

Safaee-Rad et al., "An Analytical Method for the Location Estimation of Circular Features for an Active-Vision System," IEEE, pp. 215-220, 1990.

Sanchez, A., et al., "Robot-Arm Pick and Place Behavior Programming System Using Visual Perception," in Proceedings of the 15th International Conference on Pattern Recognition, Los Alamitos, CA, Sep. 3-7, 2000, 4:507-510.

Sang, T., et al., "Vision Assisted Robotic Tele-training," IEEE International Conference on Mechatronics and Automation, pp. 1288-1293, Jul. 2005.

Sharma, R., "Visual Servoing with Independently Controlled Cameras Using a Learned Invariant Representation," in Proceedings of the 37th IEEE Conference on Decision & Control, Tampa, FL, Dec. 1998, pp. 3263-3268.

Sun et al., "Image Registration Using a 3-D Scene Representation," IEEE, pp. 828-832, 1998.

Tarabanis, K.A., et al., "A survey of sensor planning in computer vision," IEEE Transactions on Robotics and Automation, 11(1):86-104, Feb. 1995.

Tarabanis, K.A., et al., "The MVP sensor planning system for robotic vision tasks," IEEE Transactions on Robotics and Automation, 11(1):72-85, Feb. 1995.

Triboulet et al., "Finding 3D Polyhedral Object Attitude Using a Virtual Model for Industrial Machining," IEEE, pp. 57-65, 2001.

Tsai, R. et al., "An Efficient and Accurate Camera Calibration Technique for 3D Machine Vision," Proceedings of IEEE, Conference on Computer Vision and Pattern Recognition, pp. 364-374, 1986.

Tsai, R., "A Versatile Camera Calibration Technique for High-Accuracy 3D Machine Vision Metrology Using Off-the-Shelf TV Cameras and Lenses," IEEE Journal of Robotics and Automation, RA-3(4):323-344, Aug. 1987.

Tsai, R., et al., "A New Technique for Fully Autonomous and Efficient 3D Robotics Hand/Eye Calibration," in IEEE Transactions on Robotics and Automation, 5(3):345-358, Jun. 1989.

Vincze, M., "Robust Tracking of Ellipses at Frame Rate," The Journal of Pattern Recognition, 34(2):487-498, 2001.

Wei, G.-Q., et al., "Active Self-Calibration of Robotic Eyes and Hand-Eye Relationships With Model Identification," IEEE Transactions on Robotics and Automation, 14(1):158-166, Feb. 1998.

Wei, G-Q., et al., "Multisensory Visual Servoing by a Neural Network," IEEE Transactions on Systems, Man and Cybernetics, Part B: CYBERNETICS, 29(2):276-280, Apr. 1999.

Whaite, P., et al., "From uncertainty to Visual Exploration," IEEE Transactions on Pattern Analysis and Machine Intelligence 13(10):1038-1049, Oct. 1991.

Wilson et al., "Relative End-Effector Control Using Cartesian Position Based Visual Servoing, "IEEE Transactions 12(5):684-696, 1996.

Xu et al., "Determining Camera Intrinsic and Extrinsic Parameters from Multiple Images of Multiple Balls," Science 87(2):2-6, 2004.

Yamazaki et al., "Object Shape Recognition and Pose Estimation by a Camera Mounted on a Mobile Robot," Proc. 2004 IEEE/RSJ Int'l Conf. on Intelligent Robots and Systems, pp. 4019-4025, Oct. 2004.

Yoon et al., "Real-Time Tracking and Pose Estimation for Industrial Objects using Geometric Features," Proc. 2003 IEEE Int'l Conf. on Robotics and Automation, pp. 3473-3478, Sep. 2003.

Zhang, Z., "A Flexible New Technique for Camera Calibration," URL=http://research.microsoft.com/research/pubs/view.aspx?tr_id=212, Nov. 2000.

Zhou, F., et al., "Complete calibration of a structured light stripe vision sensor through planar target of unknown orientations," Image and Vision Computing, 23:59-67, 2005.

* cited by examiner

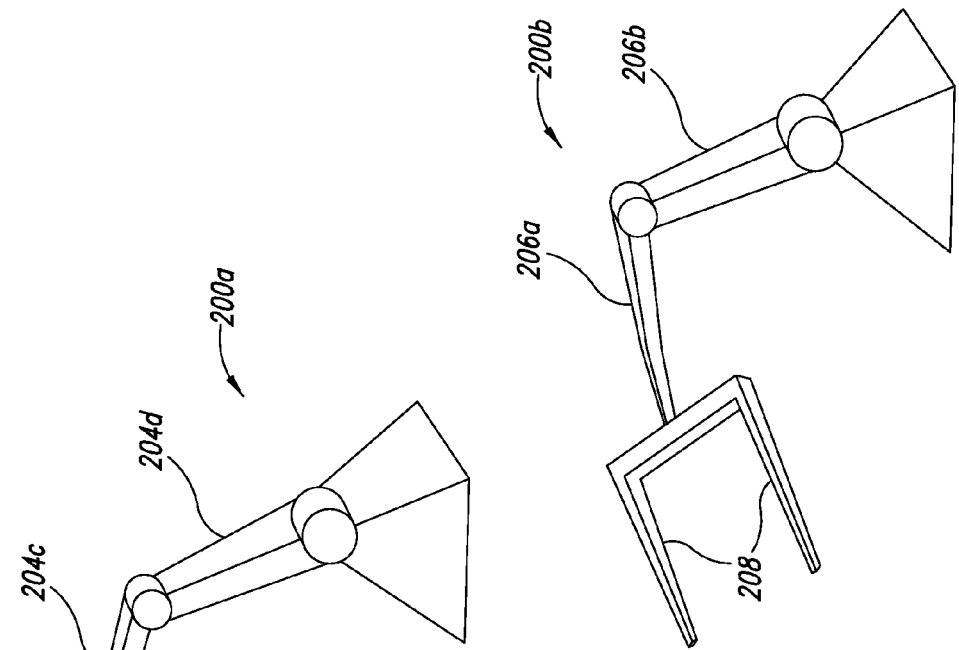
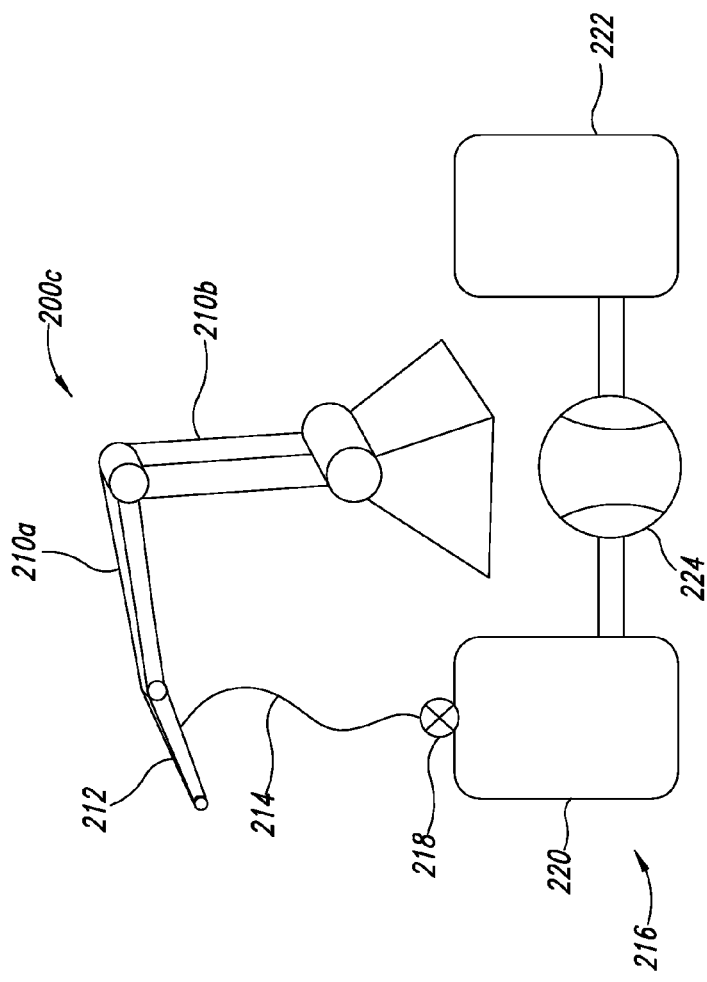

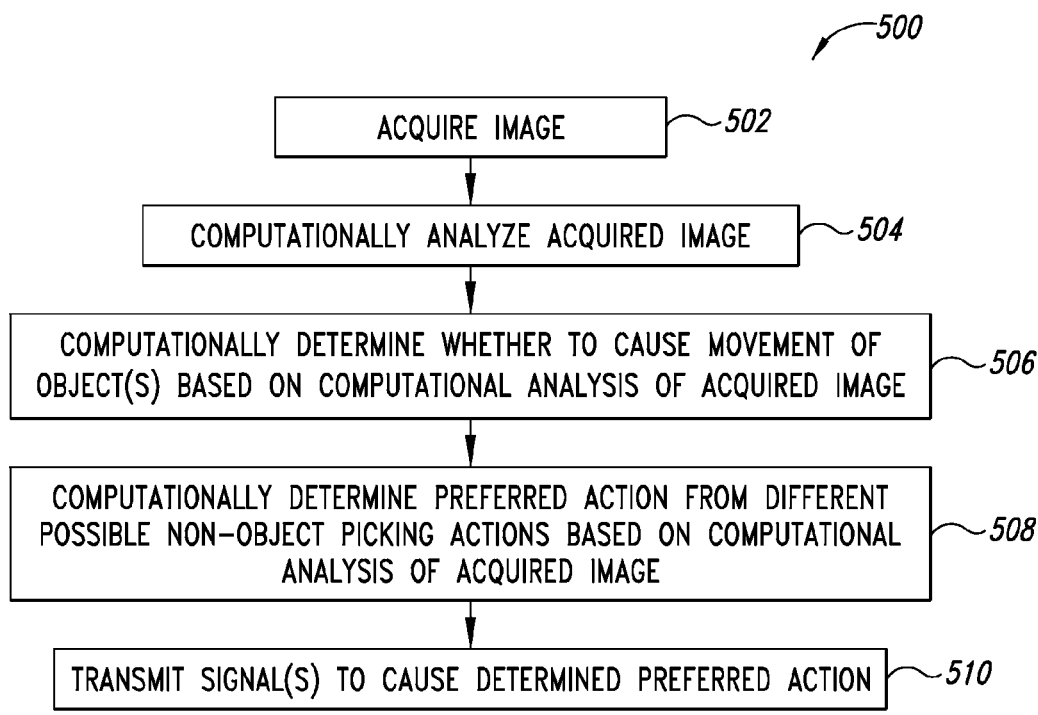

FIG. 16
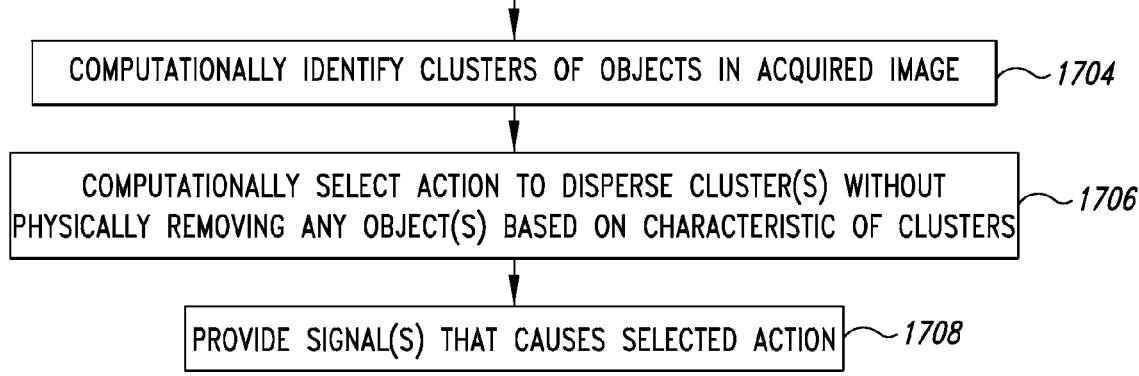
FIG. 17
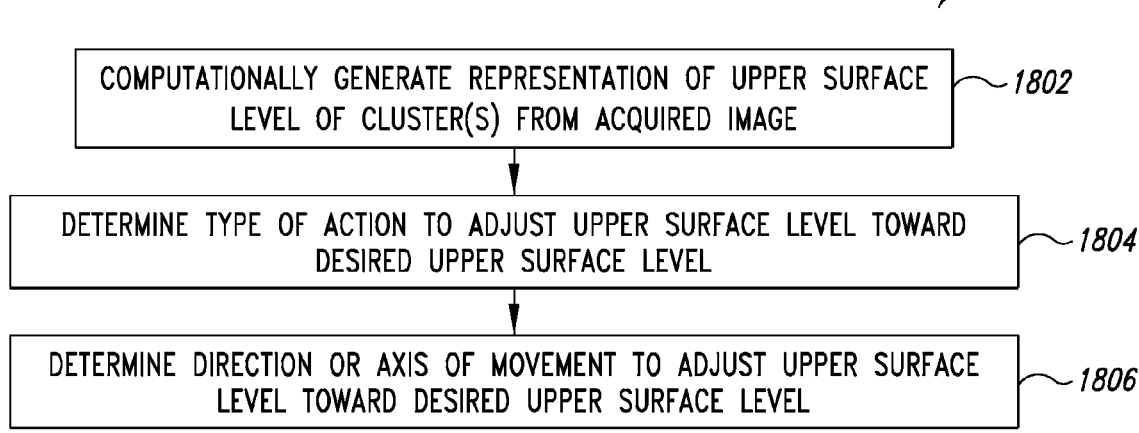
FIG. 18
ENGAGE OBJECT(S) WITH ROBOTIC MEMBER WHILE COMPUTATIONALLY IDENTIFYING CLUSTERS AND SELECTING ACTION ~1902
FIG. 19

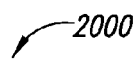
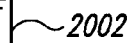
FIG. 20

METHODS AND APPARATUS TO FACILITATE OPERATIONS IN IMAGE BASED SYSTEMS

BACKGROUND

1. Field

This disclosure generally relates to robotic systems, and particularly to robotic systems that employ image based machine vision for guidance.

2. Description of the Related Art

Robotic systems are used in a variety of settings and environments. Robotic systems typically include one or more robots having one or more robotic members that are movable to interact with one or more workpieces. For example, the robotic member may include a number of articulated joints as well as a claw, grasper, or other implement to physically engage or otherwise interact with or operate on a workpiece. For instance, a robotic member may include a welding head or implement operable to weld the workpiece. The robotic system also typically includes a robot controller comprising a robotic motion controller that selectively controls the movement and/or operation of the robotic member, for example controlling the position and/or orientation (i.e., pose). The robot motion controller may be preprogrammed to cause the robotic member to repeat a series of movements or steps to selectively move the robotic member through a series of poses.

Some robotic systems employ machine vision to locate the robotic member relative to other structures and/or to determine a position and/or orientation or pose of a workpiece. Such robotic systems typically employ one or more image sensors, for example cameras, and a machine vision controller coupled to receive image information from the image sensors and configured to process the received image information. The image sensors may take a variety of forms, for example CCD arrays or CMOS sensors. Such image sensors may be fixed, or may be movable, for instance coupled to the robotic member and movable therewith. Robotic systems may also employ other controllers for performing other tasks. In such systems, the robot motion controller functions as the central control structure through which all information passes.

Robotic systems may be employed in a variety of activities, for example the picking parts or other objects. While in some environments the parts or other objects are arranged in an orderly fashion, often the parts or objects are not arranged or are randomly collected, for example in a bin or other container or on a surface. Robotic operations in such environments are commonly referred to as "bin picking" even though there may not be an actual bin. In such situations, access by the robot to particular parts may be blocked by other parts or objects, or clusters of parts or objects may occur, for example in wells or corners. Such may prevent effective picking of the parts or objects, or may significantly slow down the bin picking operation. Effective and efficient robotic operations such as bin picking become increasingly important as manufacturing and packaging moves to increasingly higher levels of automation. Hence improvements to robotic operations are commercially desirable.

BRIEF SUMMARY

A method of operating an image based system may be summarized as including: acquiring an image of an area in which a plurality of objects may reside; computationally analyzing the acquired image for a respective representation of any of the objects; based on the computational analysis of the acquired image, computationally determining a preferred action from a plurality of different possible non-object picking actions that cause movement of the objects in the area, if any, without physically picking any of the objects; and communicatively transmitting at least one signal to cause the determined preferred action to occur.

The method may further include, based on the computational analysis of the acquired image, computationally determining whether to cause movement of the objects in the area, if any. Computationally determining whether to cause movement of the objects in the area may include determining whether any of the objects are currently positioned for engagement by a robot member without causing the movement. Computationally determining whether to cause movement of the objects in the area may include determining whether an upper surface level of the objects is within a defined threshold. Computationally determining whether to cause movement of the objects in the area may include computationally determining whether at least one representation of at least one object appears in the acquired image and a representation of at least one object in the image indicates that a robot member is capable of physically engaging at least one of the objects. Computationally determining a preferred action from a plurality of different possible non-object picking actions that cause movement of the objects in the area without physically picking any of the objects may include determining which of the different possible non-object picking actions has a highest likelihood of exposing at least one of the objects. Computationally determining a preferred action from a plurality of different possible non-object picking actions that cause movement of the objects in the area without physically picking any of the objects may include computationally generating a representation of a current upper surface level of the objects from the acquired image, and determining at least one movement calculated to move the current upper surface level toward a desired upper surface level. Computationally determining a preferred action from a plurality of different possible non-object picking actions that cause movement to the objects in the area without physically picking any of the objects may include determining which of the different possible non-object picking actions has a highest likelihood of distributing the objects to achieve a more uniform upper surface level. Computationally determining a preferred action from a plurality of different possible non-object picking actions that cause movement to the objects in the area without physically picking any of the objects may include determining at least one axis about or at least one direction in which to at least one of tilt the area, shake the area, sweep the objects or blow the objects. Computationally determining a preferred action from a plurality of different possible non-object picking actions that cause movement of the objects in the area without physically picking any of the objects may include determining a preferred action based at least in part on at least one of a geometry of a container that carries the objects, a size of the objects or a geometry of the objects. Computationally analyzing the acquired image for a respective representation of any of the objects may include identifying a cluster of the objects and computationally determining a preferred action from a plurality of different possible non-object picking actions that cause movement of the objects in the area without physically picking any of the objects includes determining an action to disperse the cluster of the objects. Communicatively transmitting at least one signal to cause the determined preferred action to occur may include transmitting the at least one signal to at least one of a robotic controller that controls a robotic arm or at least one actuator coupled to a move a table or container on which the objects are carried. Computationally analyzing the acquired image for a respective representation of any of the objects may include performing at least one of a feature recognition, a registration or a pose estimation for at least one of the objects based on the respective representation of the object in the acquired image. Computationally selecting an action to disperse the one or more clusters based at least in part on a characteristic of the identified one or more clusters may include determining at least one direction or axis of movement based at least in part on at least one representation of at least one surface of a container or a support structure that carries the objects.

An image based system may be summarized as including at least one image acquisition device that acquires an image of an area in which a plurality of objects may reside; at least one processor; and at least one processor-readable storage medium that stores processor executable instructions that cause the processor to: analyze the acquired image for a respective representation of any of the objects; based on the analysis of the acquired image, determine a preferred action from a plurality of different possible non-object picking actions that cause movement of the objects in the area, if any, without physically picking any of the objects; and transmit at least one signal to cause the determined preferred action to occur.

The image based system may further include at least one robot selectively positionable to physically pick at least one of the objects. The at least one robot may be positionable to cause movement of the objects in accordance with the at least one signal.

The image based system may further include a support structure on which the objects are carried; and at least one actuator coupled to physically move the support structure in accordance with the at least one signal.

A method of operating an image based system may be summarized as including repeatedly acquiring images of an area in which a number of objects may reside; computationally identifying one or more clusters of the objects in the acquired image; computationally selecting an action to disperse the one or more clusters of the objects from a plurality of different possible actions without physically removing any of the objects from the area, based at least in part on a characteristic of the identified one or more clusters; and providing a signal that causes the selected action. Computationally selecting an action to disperse the one or more clusters based at least in part on a characteristic of the identified one or more clusters may include computationally generating a representation of an upper surface level of the one or more clusters of objects from the acquired image, and determining at least one direction or axis of movement to adjust the upper surface level of the one or more clusters toward a defined upper surface level. The method may further include engaging at least one of the objects with a robotic member and performing the desired action while the robotic member engages at least one of the objects. Computationally selecting an action to disperse the one or more clusters of the objects from a plurality of different possible actions without physically removing any of the objects from the area, based at least in part on a characteristic of the identified one or more clusters may include identifying an action type and at least one of an action axis or an action direction. Computationally selecting an action to disperse the one or more clusters based at least in part on a characteristic of the identified one or more clusters may include computationally generating a representation of at least one surface of a container or a support structure that carries the objects, and determining at least one direction or axis of movement based at least in part on the generated representation.

An image based system may be summarized as including at least one image acquisition device that repeatedly acquires images of an area in which a plurality of objects may reside; at least one processor; and at least one processor-readable storage medium that stores processor executable instructions that cause the processor to: identify one or more clusters of the objects in the acquired image; select an action to disperse the one or more clusters of the objects from a plurality of different possible actions that do not physically remove any of the objects from the area, based at least in part on a characteristic of the identified one or more clusters; and provide a signal that causes the selected action.

The instructions may cause the processor to select an action to disperse the one or more clusters based at least in part on a characteristic of the identified one or more clusters by generating a representation of an upper surface level of the one or more clusters of objects from the acquired image, and determining at least one direction or axis of movement to adjust the upper surface level of the one or more clusters toward a defined upper surface level.

The image based system may further include at least one robot selectively positionable to physically remove at least one of the objects from the area. The at least one robot may be selectively positionable to cause movement of a support structure on which the one or more objects are carried, in accordance with the at least one signal. The image based system may further include a support structure on which the objects are carried; and at least one actuator coupled to physically move the support structure in accordance with the at least one signal.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2A is an isometric diagram of a redistribution mechanism configured to move the objects directly by physically engaging the objects with an implement, according to one illustrated embodiment.

FIG. 2B is an isometric diagram of a redistribution mechanism configured to move the objects indirectly by physically moving a container holding the objects, according to one illustrated embodiment.

FIG. 2C is an isometric diagram of a redistribution mechanism configured to move the objects directly by blowing a fluid at the objects, according to one illustrated embodiment.

FIG. 5 is a flow diagram showing a method of operating an image based robotic cell to performing picking with object or workpiece redistribution, according to one illustrated embodiment.

FIG. 6 is a flow diagram showing a method of operating an image based robotic cell to determine whether to cause movement of object(s) or workpiece(s) based on computational analysis of an acquired image, according to one illustrated embodiment.

FIG. 7 is a flow diagram showing a method of operating an image based robotic cell to determine whether to cause movement of object(s) or workpiece(s) based on computational analysis of an acquired image, according to one illustrated embodiment.

FIG. 8 is a flow diagram showing a method of operating an image based robotic cell to determine whether to cause movement of object(s) or workpiece(s), according to one illustrated embodiment.

FIG. 9 is a flow diagram showing a method of operating an image based robotic cell to determine a preferred action from different possible non-object picking actions based on the computational analysis of the acquired image, according to one illustrated embodiment.

FIG. 16 is a flow diagram showing a method of operating an image based robotic cell that may be useful in the method of FIG. 5, according to one illustrated embodiment.

FIG. 17 is a high level flow diagram showing a method of operating an image based robotic cell, according to another illustrated embodiment.

FIG. 18 is a flow diagram showing a method of operating an image based robotic cell to computationally select an action to disperse the one or more clusters of the objects or workpieces from a plurality of different possible actions without physically removing any of the objects from the area, according to one illustrated embodiment.

FIG. 19 is a flow diagram showing a method of operating an image based robotic cell that may be useful in performing the method of FIG. 17, according to one illustrated embodiment.

FIG. 20 is a flow diagram showing a method of operating an image based robotic cell to determine a preferred action based at least in part on at least one of a geometry of a container that carries the objects, a size of the objects or a geometry of the objects, that may be useful in performing the methods of FIG. 4 or FIG. 17, according to one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with robots, networks, image sensors and controllers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1A:
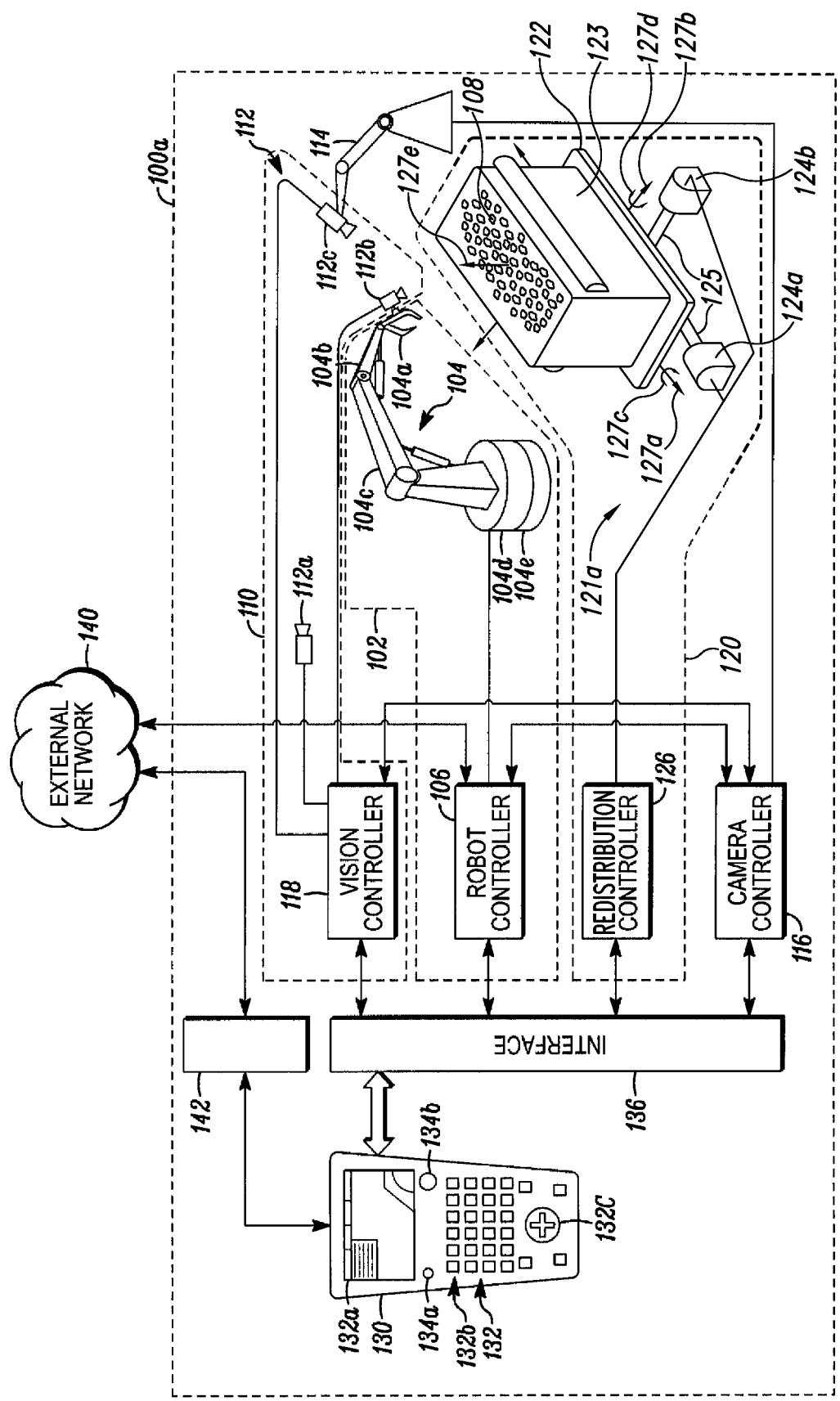
FIG. 1A is a schematic diagram of an environment including a robotic cell communicatively coupled to an external network, the robotic cell including a robot system operable to pick objects, a vision subsystem configured to acquire images of objects, redistribution subsystem system configured to move a container holding the objects, teaching pendant, and pendant interface, according to one illustrated embodiment.

FIG. 1A shows a robotic cell 100a in the form of a vision based system, according to one illustrated embodiment.

The robotic cell 100a includes a robotic system (delineated by broken line) 102 which includes one or more robots 104 and one or more robot controllers 106. The robot 104 includes one or more robotic members 104a-104c which are selectively movable into a variety of positions and/or orientations (i.e., poses) via one or more actuators such as motors, hydraulic or pneumatic pistons, gears, drives, linkages, etc. The robot 104 may also include a pedestal 104d rotatably mounted to a base 104e, which may be driven by one or more actuators. The robot controller 106 is communicatively coupled to the robot 104 to provide control signals to control movement of the robotic members 104a-104d. As used herein and in the claims, the term coupled and variations thereof (e.g., couple, coupling, couples) means directly or indirectly connected where logically or physically. The communicative coupling may also provide feedback from the robot 104, for example feedback from one or more position or orientation sensors such as rotational encoders, force sensors, acceleration sensors, gyroscopes, etc., which may be indicative of a position or orientation or pose of one or more parts of the robot 104.

The robot controller 106 may be configured to provide signals that cause the robot 104 to interact with one or more workpieces 108. The workpieces can take any of a variety of forms, for example parts, vehicles, parcels, items of food, etc. Interaction may take a variety of forms, for example physically engaging the workpiece, moving or rotating the workpiece, or welding the workpiece, etc.

The robot controller 106 may include one or more processors, for example, a central processing unit (e.g., microprocessor, microcontroller, application specific integrated circuit, field programmable gate array, etc.). The robot controller 106 may include one or more processor readable memories, for example ROM and/or RAM. The central processing unit of the robot controller 106 may execute instructions stored in ROM and/or RAM to control operation (e.g., motion) of the robot 104. In some embodiments, the robot controller may perform processing or post-processing on the image information, for example performing pose estimation. Such may allow the robot controller 106 to determine a pose of the workpiece 108 such as a part or other object, the robot 104, or some other structure or element of the robotic cell 100a. Such embodiments may or may not employ a vision controller 118, but may employ other controllers, for example a camera controller 116, redistribution controller 126, inspection controller (not shown) or other controller(s).

The robot controller 106 may include a vision controller communications port to provide communications with the vision controller 118. The robot controller 106 may also include a redistribution controller communications port to provide communications with the redistribution controller 126 and a camera controller communications port to provide communications with the camera controller 116. The robot controller 106 may include a port to provide communications with the robot control terminal 130 which may form part of the interface. The robot controller may further include a robot communications port to provide communications with the robot 104. Additionally, the robot controller 106 may include a port to provide communications with the external network 140. The various components of the robot controller 106 may be coupled by one or more buses, which may take the form or one or more communications buses, data buses, instruction buses, and/or power buses.

The robotic cell 100a may also include a vision system (delineated by broken line) 110. The vision system may include one or more image acquisition devices, for example cameras 112a-112c (collectively 112). The cameras 112 may take a variety of forms, for example CCD based or CMOS based cameras. The cameras 112 may, for instance take the form of digital still cameras, analog video cameras and/or digital video cameras. One or more of the cameras 112 may be stationary or fixed, for example camera 112a. One or more of the cameras 112 may be mounted for movement with a portion of the robot 104, for example camera 112b. One or more of the cameras 112 may be mounted for movement independently of the robot 104, for example camera 112c. Such may, for example, be accomplished by mounting the camera 112c to a portion of a secondary robot 114, the position and/or orientation or pose of which is controlled by a camera controller 116. Alternatively, a pan and tilt mechanism may be employed. The camera controller 116 may be communicatively coupled to control the secondary robot 114 and/or receive feedback regarding a position and/or orientation or pose of the secondary robot 114 and/or camera 112c.

The vision system 110 includes a vision controller 118 communicatively coupled to receive image information from the cameras 112. The vision controller 118 may be programmed to process or preprocess the received image information. In some embodiments, the vision system may include one or more frame grabbers (not shown) to grab and digitize frames of analog video data. The vision controller 118 may be directly communicatively coupled to the robot controller 106 to provide processed or preprocessed image information. For instance, the vision controller 118 may provide information indicative of a position and/or orientation or pose of a workpiece such as a part or other object to the robot controller. The robot controller 106 may control a robot 104 in response to the processed or preprocessed image information provided by the vision controller 118.

The vision controller 118 may include one or more processors such as a central processing unit (e.g., microprocessor, microcontroller, application specific integrated circuit, field programmable gate array, etc.) and/or digital signal processor (DSP) operable to process or preprocess image information received from the cameras 112. For instance, the vision controller 118 may be configured to perform pose estimation, determining a position and orientation of a workpiece in some reference frame (e.g., camera reference frame, robot reference frame, real world reference frame, etc.). The vision controller 118 may employ any of the numerous existing techniques and algorithms to perform such pose estimation. The vision controller 118 may include one or more processor readable memories, for example read-only memory (ROM) and/or random access memory (RAM). The central processing unit of the vision controller 118 may execute instructions stored in ROM and/or RAM to control operation process or preprocess image information.

The vision controller may include one or more camera communications ports that provide an interface to the cameras 112. The vision controller 118 may include one or more robot control terminal communication ports to provide communications with the robot control terminal 130 and which may be considered part of the robot control terminal interface 136. The vision controller 118 may include a robot controller communications port that functions as an interface with the robot controller 106. The vision control 118 may further include a camera controller communications port to that functions as an interface with the camera controller 116. The vision controller 118 may include one or more buffers operable to buffer information received via the camera communications ports. The various components of the vision controller 118 may be coupled by one or more buses, which may take the form or one or more communications buses, data buses, instruction buses, and/or power buses.

The robotic cell 100a may further include a redistribution subsystem (delineated by broken line) 120 which may be used to redistribute the workpieces 108 by moving workpieces 108 relative to one another. The redistribution subsystem 120 may include any variety of structures to move the workpieces 108, either directly, or indirectly. For instance, the redistribution subsystem 120 may include a redistribution mechanism 121a such as a support structure 122, for example a table, and a suitable drive mechanism to drive the support structure 122, for example one or more motors 124a, 124b and linkages 125. The workpieces 108 may be collected in an area of a container 123 which may be supported by the support structure 122 or may be collected directly on an area of the support structure 122. The drive mechanism may be configured to move the support structure 122 in a variety of fashions, for instance shaking, tilting, rotating or pivoting, and along or about a number of axes (indicated by reference numerals 127a-127e). For instance, the drive mechanism may move the support structure 122 in two or more dimensions, for example allowing translation along three orthogonal axis and/or allow rotation about three orthogonal axes (i.e., pitch, roll and yaw).

The redistribution subsystem 120 may also include a redistribution controller 126, for instance a table motion controller. The redistribution controller 126 may be communicatively coupled to control movement of the support structure 122, for example supplying signals to control the operation of motors 124a, 124b and thereby control the position, speed, and/or acceleration of the support structure (e.g., table) 122. The redistribution controller 126 may also be communicatively coupled to receive feedback from the motors 124a, 124b, linkages 125 and/or one or more sensors. For example, the redistribution controller 126 can receive information from a rotational encoder or other sensor. Such information may be used to determine a position, speed, and/or acceleration of the support structure 122, motors 124a, 124b, and/or linkages 125. The redistribution controller 126 may be communicatively coupled with the robot controller 106 to receive instructions therefrom and to provide information or data thereto.

The redistribution controller 126 may include one or more processors such as central processing unit (e.g., microprocessor, microcontroller, application specific integrated circuit, field programmable gate array, etc.). The redistribution controller 126 may include one or more processor readable memories such as ROM and/or RAM. The central processing unit of the redistribution controller 126 may execute instructions stored in ROM and/or RAM to control operation (e.g., position, motion, speed, acceleration) of the support structure 122, container 123, motor 124a, 124b, and/or various redistribution mechanisms discussed herein.

The redistribution controller 126 may include one or more interfaces to provide communications with a redistribution mechanism or portion thereof such as motors 124a, 124b. The redistribution controller 126 can include a digital-to-analog converter to convert digital signals from the central processing unit into analog signals suitable for control of the motors 124a, 124b. The redistribution controller 126 may also include an analog-to-digital converter to convert analog information collected from the motors 124a, 124b or sensor (not shown) into a form suitable for use by the central processing unit. The redistribution controller 126 may include one or more conveyor communications ports to provide communications between the converters and the motors 124a, 124b, other actuators (not shown) and/or sensors. The redistribution controller 126 may further include a robot control terminal communications port that provides direct communications with the robot control terminal 130 independently of the robot controller 106 and thus may form part of the robot control terminal communications interface 136. One or more of the components of the redistribution controller 126 may be coupled by one or more buses, which may take the form or one or more communications buses, data buses, instruction buses, and/or power buses.

The robotic cell 100a may optionally include a camera controller 116 that may be used to control operation and/or pose of image acquisition devices such as cameras 112. The camera controller 116 may include one or more processors such as central processing unit (e.g., microprocessor, microcontroller, application specific integrated circuit, field programmable gate array, etc.). The camera controller 116 may include one or more processor readable memories, for example, ROM and/or RAM. The central processing unit of the camera controller 116 may execute instructions stored in ROM and/or RAM to control operation of the auxiliary robot 114, for example controlling position, orientation or pose of the auxiliary robot 114 and hence the camera 112c carried thereby. While illustrated as controlling only a single auxiliary robot 114, the camera controller 116 may control multiple auxiliary robots (not shown), or the robotic cell 100a may include multiple camera controllers (not shown) to control respective auxiliary robots.

The camera controller 116 may include one or more interfaces to provide communications with the auxiliary robot 114. For example, the camera controller 116 may include a digital-to-analog converter to convert digital signals from the central processing unit into an analog form suitable for controlling the auxiliary robot 114. The camera controller 116 may also include an analog-to-digital converter to convert analog signals collected by one or more sensors or encoders associated with the auxiliary robot 114 into a form suitable for use by the central processor unit. The camera controller 116 may include one or more auxiliary robot communications ports to provide communications between the converters and the auxiliary robot 114 and/or sensors (not shown). The camera controller 116 may also include a robot control terminal communications port to provide communications with a robot control terminal 130, independently of the robot controller 106. The camera controller 116 may also include a robot controller communications port to provide communications with the robot controller 106 and/or a vision controller communications port to provide communications with the vision controller 118. The various components of the camera controller 116 may be coupled by one or more buses, which may take the form or one or more communications buses, data buses, instruction buses, and/or power buses.

Robotic cell 100a may also include a user operable robot control terminal 130 that may be used by a user to control operation of the robot 104. In particular, the user operable robot control terminal 130 may take the form of a handheld device including a user interface 132 that allows a user to interact with the other components of the robotic cell 100a. The user operable robot control terminal 130 may be referred to as a teaching pendant.

The robot control terminal or teaching pendant 130 may take a variety of forms including desktop or personal computers, laptop computers, workstations, main frame computers, handheld computing devices such as personal digital assistants, Web-enabled BLACKBERRY® OR TREO® type devices, cellular phones, etc. Such may allow a remote user to interact with the robotic system 102, vision system 110 and/or other components of the robotic cell 100a via a convenient user interface 132. As explained in more detail below, the user interface 132 may take a variety of forms including keyboards, joysticks, trackballs, touch or track pads, hepatic input devices, touch screens, CRT displays, LCD displays, plasma displays, DLP displays, graphical user interfaces, speakers, microphones, etc.

The user interface 132 may include one or more displays 132a operable to display images or portions thereof captured by the cameras 112. The display 132a is also operable to display information collected by the vision controller 118, for example position and orientation of various cameras 112. The display 132 is further operable to display information collected by robot controller 106, for example information indicative of a position and/or orientation or pose of the robot 104 or robotic members 104a-104d. The display 132a may be further operable to present information collected by the redistribution controller 126, for example position, speed, or acceleration of support structure 122, motors 124a, 124b, container 123, and/or workpieces 108. The display 132a may further be operable to present information collected by the camera controller 116, for example position or orientation or pose of secondary robot 114 or camera 112c.

The user interface 132 may include one or more user input devices, for example one or more user selectable keys 132b, one or more joysticks, rocker switches, trackpads, trackballs or other user input devices operable by a user to input information into the robot control terminal 130.

The user interface 132 of the robot control terminal 130 may further include one or more sound transducers such as a microphone 134a and/or a speaker 134b. Such may be employed to provide audible alerts and/or to receive audible commands. The user interface may further include one or more lights (now shown) operable to provide visual indications, for example one or more light emitting diodes (LEDs).

The robot control terminal 130 is communicatively coupled to the robot controller 106 via a robot control terminal interface 136. The robot control terminal 130 may also include other couplings to the robot controller 106, for example to receive electrical power (e.g., a Universal Serial Bus USB), to transmit signals in emergency situations, for instance to shut down or freeze the robot 104.

The robot control terminal interface 136 may also provide communicative coupling between the robot control terminal 130 and the vision controller 118 so as to provide communications therebetween independently of the robot controller 106. In some embodiments, the robot control terminal interface 136 may also provide communications between the robot control terminal 130 and the redistribution controller 126 and/or camera controller 116, independently of the robot controller 106. Such may advantageously eliminate communications bottlenecks which would otherwise be presented by passing communications through the robot controller 106 as is typically done in conventional systems.

The robot control terminal 130 may be communicatively coupled to an external network 140 via an external network interface 142. The vision controller 118 may also be communicatively coupled to the external network 140.

The user interface 132 may include robot related information or data received from a robot controller 106. Such may, for example, include information indicative of: a current position (e.g., X, Y Z) of one or more portions of the robot, a current orientation (e.g., Rx, Ry, Rz) of one or more portions of the robot, an identification of a workpiece (e.g., Work Object), identification of a tool (e.g., Tool, for instance grasper, welding torch, etc.), and an amount of motion increment (e.g., motion increment).

The user interface 132 may provide camera related information or data received from the vision controller, independently of the robot controller 106. Such may, for example, include information indicative of: camera properties (e.g., Camera properties), camera frame rate (e.g., Frame rate), camera resolution in two dimensions (e.g., Resolution X, Resolution Y), camera calibration data (e.g., Calibration data)), camera focal length (e.g., Focal length), camera center (e.g., Center) and/or camera distortion (e.g., Distortions). Such may additionally, or alternatively include information indicative of a position, orientation or pose of the workpiece, for instance as determined by the vision controller. The user interface 132 may also provide one or more images captured by one or more of the image sensor, such as a user selected camera 112a-112c. Such may, for example, show a portion of a workpiece as imaged by a selected camera.

The various communication paths illustrated by arrows in FIG. 1A may take a variety of forms including wired and wireless communication paths. Such may include wires, cables, networks, routers, servers, infrared transmitters and/or receivers, RF or microwave transmitters or receivers, and other communication structures. Some communications paths may be specialized or dedicated communications paths between respective pairs or other groups of controllers to provide efficient communications therebetween. In some embodiments, these communications paths may provide redundancy, for example providing communications when another communications path fails or is slow due to congestion.

Figure 1B:
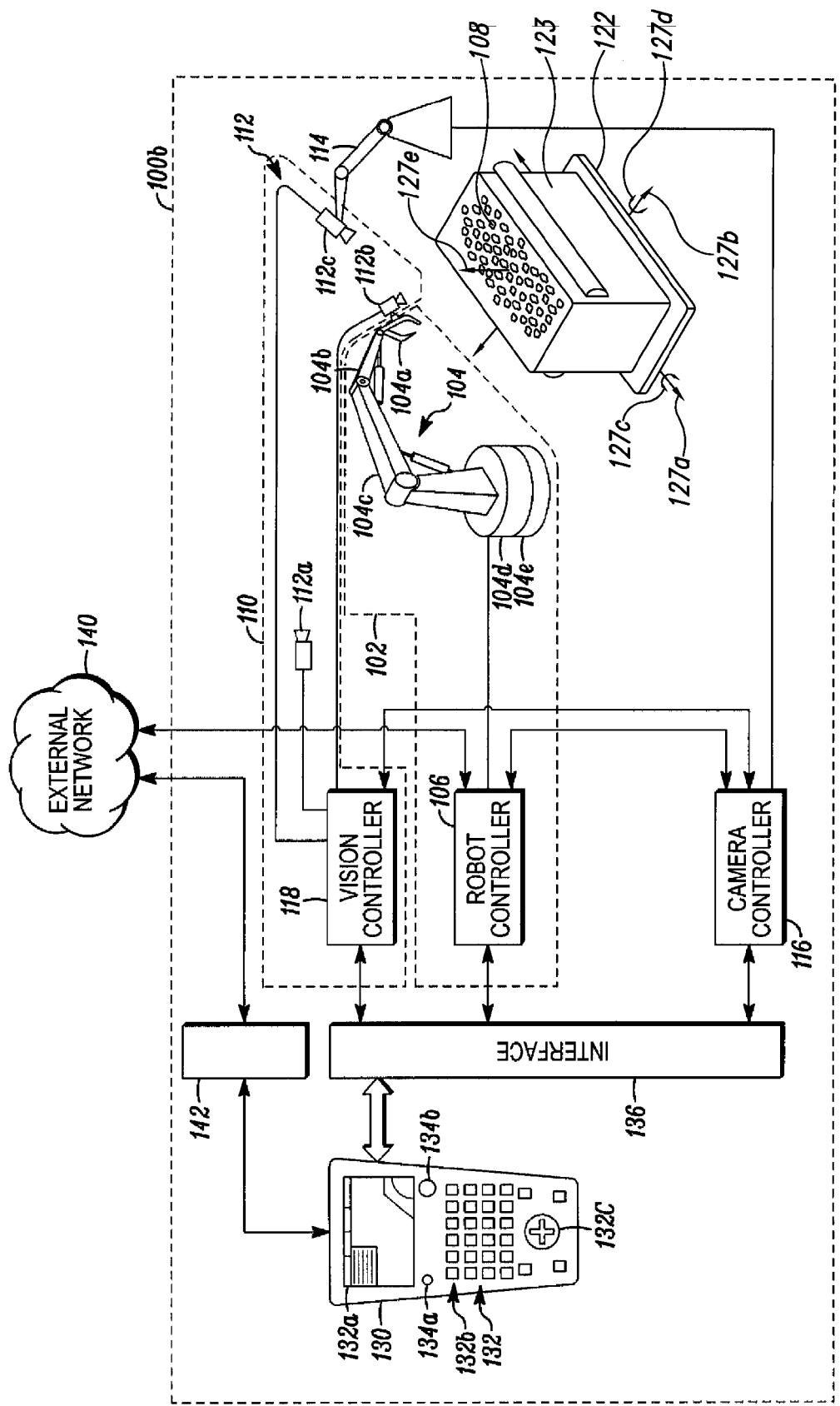
FIG. 1B is a schematic diagram of an environment including a robotic cell communicatively coupled to an external network, the robotic cell including a robot system operable to pick objects and to move a container or support structure holding the objects, a vision system configured to acquire images of objects, teaching pendant and pendant interface, according to another illustrated embodiment.

FIG. 1B shows a robotic cell 100b according to another illustrated embodiment. This embodiment, and those alternative embodiments and other alternatives described herein, are substantially similar to the previously described embodiment, and common acts and structures are identified by the same reference numbers. Only significant differences in operation and structure are described below.

The robotic cell 100b omits the dedicated redistribution subsystem 120 (FIG. 1A), and instead employs the robot 104 to redistribute the workpieces 108. For example, the robot controller 106 may cause the robot to indirectly move the workpieces 108 by physically engaging the support structure 122 or the container 123. For instance, an end effector 104a of the robot 104 may push or grab a portion of the support structure 122 or container 123. For instance, the end effector 104 may move the support structure 122 or container 123 in two or more dimensions, for example allowing translation along three orthogonal axis and/or allow rotation about three orthogonal axes (i.e., pitch, roll and yaw).

FIG. 2A shows a redistribution mechanism 200a configured to move the workpieces 108 (FIGS. 1A, 1B) directly by physically engaging the workpieces 108 with a tool or implement 202, according to one illustrated embodiment.

For instance, the redistribution mechanism 200a may include a number of articulated arms 204a-204d that carry the tool or implement 202. The tool or implement 202 may, for example, take the form of a bar, a broom head, or a rake. The particular shape and/or size will vary depending on the configuration and size of the workpieces 108 and or container 123 (FIGS. 1A, 1B). The redistribution mechanism 200a may be in addition to the robot 104 and/or the auxiliary robot 114. Alternatively, the tool or implement 202 may be attached or otherwise carried by the robot 104 or auxiliary robot 114. The redistribution mechanism 200a may cause the tool or implement 202 to move over an upper surface of the workpieces 108, distributing the workpieces to produce a more uniform or even upper surface. The tool or implement 202 may be translated and/or rotated in a variety of directions and at a variety of heights or levels based on an analysis or evaluation of a current distribution of the workpieces 108 from one or more images acquired by the vision control subsystem 110. Redistributing the workpieces 108 may make it easier or quicker to pick or otherwise remove a workpiece 108 from the support structure 122 or container 123. For instance, redistributing workpieces 108 to have a more uniform upper surface may reduce occlusion or otherwise make workpieces 108 more accessible to the robot 104.

FIG. 2B shows a redistribution mechanism 200c configured to move the objects directly by physically engaging the objects with an implement, according to one illustrated embodiment.

For instance, the redistribution mechanism 200b may include a number of articulated arms 206a-206b that carry the tool or implement 208. The tool or implement 208 may, for example, take the form of a fork or other engagement member sized and configured to engage (physically, magnetically) a portion (e.g., rail, slot) of the container 123 (FIGS. 1A, 1B) or support structure 122. The particular shape and/or size of the tool or implement 108 will vary depending on the configuration and size of the container 123. The redistribution mechanism 200b may be in addition to the robot 104 and/or the auxiliary robot 114. Alternatively, the tool or implement 208 may be attached or otherwise carried by the robot 104 or auxiliary robot 114. The redistribution mechanism 200b may cause the tool or implement 208 to move (e.g., shake, tilt, translate, rotate or pivot) the container 123 or support structure 122 to distribute the workpieces 108 to produce a more uniform or even upper surface. The redistribution mechanism 200b may translate and/or rotate the container 123 or support structure 122 in a variety of directions and at a variety of heights or levels based on an analysis or evaluation of a current distribution of the workpieces 108 from one or more images acquired by the vision control subsystem 110. Redistributing the workpieces 108 may make it easier or quicker to pick or otherwise remove a workpiece 108 from the support structure 122 or container 123. For instance, redistributing workpieces 108 to have a more uniform upper surface may reduce occlusion or otherwise make workpieces 108 more accessible to the robot 104.

FIG. 2C shows a redistribution mechanism 200c configured to move the objects directly by physically engaging the objects with a fluid flow, according to one illustrated embodiment.

For instance, the redistribution mechanism 200c may include a number of articulated arms 210a, 210b that carry a nozzle 212 or other port to direct fluid flow. The nozzle 212 may, for example, be coupled via a conduit 214 to a pressurized source 216 of a fluid (e.g., liquid, or gas for instance air) via one or more valves 218 that are operable to control fluid flow from the pressurized source 216 to the nozzle 212. The pressurized source 216 may include one or more reservoirs, for instance a pressurized reservoir 220 and an unpressurized reservoir 222, and may include one or more sources of pressure (e.g., compressor, pump, fan, etc.) 224. The nozzle 212 may be employed to direct a flow of fluid at portions of the collection of workpieces 108 to redistribute the workpieces 108 in a desired fashion. The particular shape and/or size of the nozzle 212 or fluid flow may vary depending on the configuration and size of workpieces 108 and/or the container 123. The redistribution mechanism 200c may be in addition to the robot 104 and/or the auxiliary robot 114. Alternatively, the nozzle 212 may be attached or otherwise carried by the robot 104 or auxiliary robot 114. The redistribution mechanism 200c may cause the nozzle 212 to move the workpieces 108 to distribute the workpieces 108 to produce a more uniform or even upper surface. The redistribution mechanism 200c may translate and/or rotate the workpieces 108 a variety of directions and at a variety of heights or levels based on an analysis or evaluation of a current distribution of the workpieces 108 from one or more images acquired by the vision control subsystem 110. Redistributing the workpieces 108 may make it easier or quicker to pick or otherwise remove a workpiece 108 from the support structure 122 or container 123. For instance, redistributing workpieces 108 to have a more uniform upper surface may reduce occlusion or otherwise make workpieces 108 more accessible to the robot 104.

Figure 3:
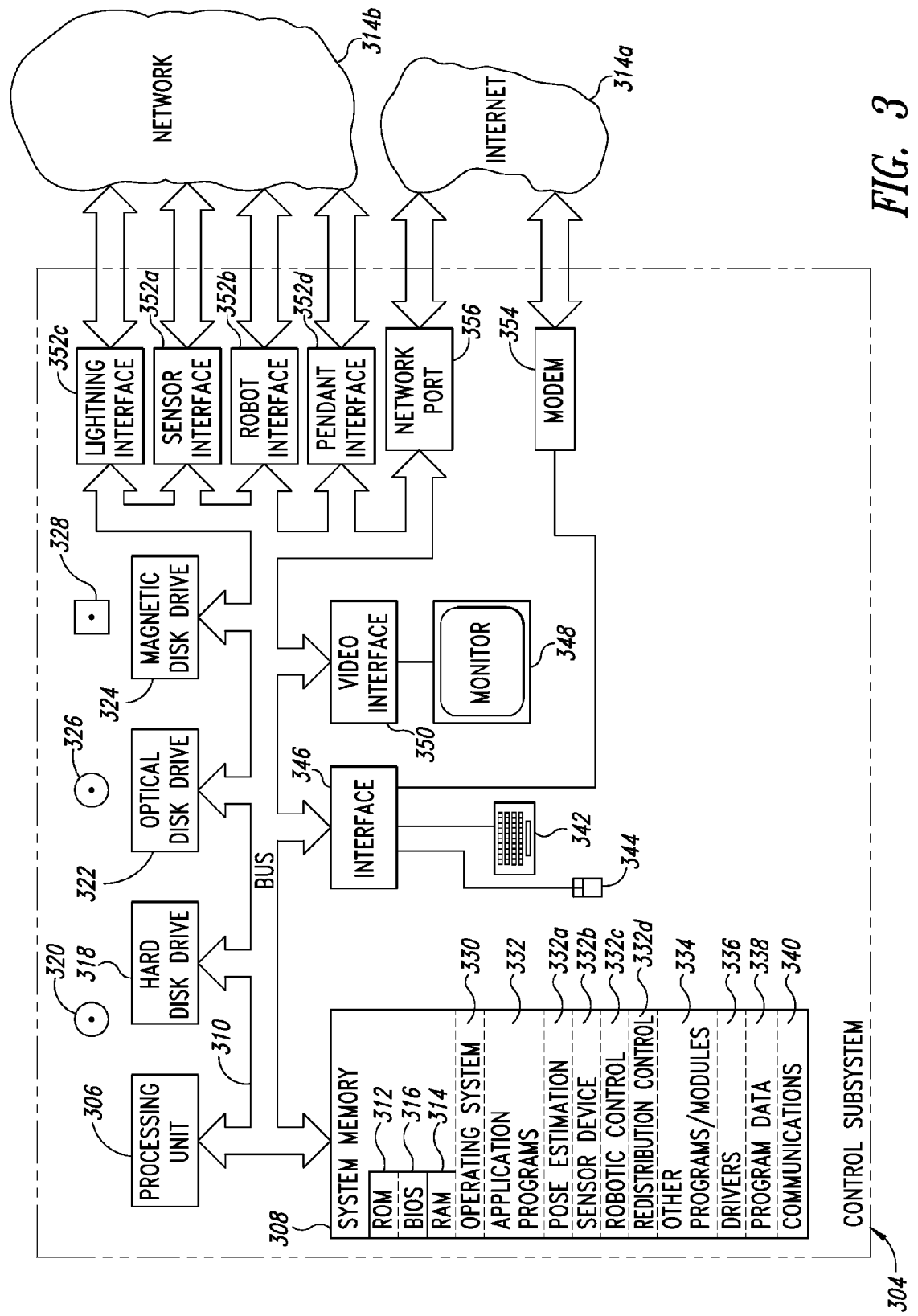
FIG. 3 is a schematic diagram of a control system, according to one illustrated embodiment.

FIG. 3 and the following discussion provide a brief, general description of a suitable control subsystem 304 in which the various illustrated embodiments can be implemented. The control subsystem 304 may, for example, implement the robot controller 106, the vision controller 118, camera controller 116 redistribution controller and/or robot control terminal 130 (FIG. 1). For instance, each of the robot controller 106, the vision controller 118, camera controller 116 redistribution controller and/or robot control terminal 130 may be implemented as a respective control subsystem 304. Alternatively, one control subsystem 304 may implement one or more of the robot controller 106, vision controller 118, camera controller 116 redistribution controller and/or robot control terminal 130.

Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The control subsystem 304 may take the form of a conventional PC, which includes a processing unit 306, a system memory 308 and a system bus 310 that couples various system components including the system memory 308 to the processing unit 306. The control system 304 will at times be referred to in the singular herein, but this is not intended to limit the embodiments to a single system, since in certain embodiments, there will be more than one system or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 306 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 3 are of conventional design. As a result, such blocks need not be described in further detail herein, as they will be understood by those skilled in the relevant art.

The system bus 310 can employ any known bus structures or architectures, including a memory bus with memory controller, a peripheral bus, and a local bus. The system memory 308 includes read-only memory ("ROM") 312 and random access memory ("RAM") 314. A basic input/output system ("BIOS") 316, which can form part of the ROM 312, contains basic routines that help transfer information between elements within the control subsystem 304, such as during start-up. Some embodiments may employ separate buses for data, instructions and power.

The control subsystem 304 also includes a hard disk drive 318 for reading from and writing to a hard disk 320, and an optical disk drive 322 and a magnetic disk drive 324 for reading from and writing to removable optical disks 326 and magnetic disks 328, respectively. The optical disk 326 can be a CD or a DVD, while the magnetic disk 328 can be a magnetic floppy disk or diskette. The hard disk drive 318, optical disk drive 322 and magnetic disk drive 324 communicate with the processing unit 306 via the system bus 310. The hard disk drive 318, optical disk drive 322 and magnetic disk drive 324 may include interfaces or controllers (not shown) coupled between such drives and the system bus 310, as is known by those skilled in the relevant art. The drives 318, 322, 324, and their associated computer-readable media 320, 326, 328, provide nonvolatile storage of computer-readable instructions, data structures, program modules and other data for the control subsystem 304. Although the depicted control subsystem 304 employs hard disk 320, optical disk 326 and magnetic disk 328, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 308, such as an operating system 330, one or more application programs 332, other programs or modules 334, drivers 336 and program data 338.

The application programs 332 may, for example, include pose estimation logic 332a, sensor device logic 332b, robotic subsystem control logic 332c, redistribution subsystem logic 332d. The logic 332a-332d may, for example, be stored as one or more executable instructions. As discussed in more detail below, the pose estimation logic 332a may include logic or instructions to perform initialization, training and runtime operation, and may include feature identification and matching or registration logic. The sensor device logic 332b may include logic or instructions to operate image capture devices, range finding devices, and light sources, such as structured light sources. As discussed in more detail below, the sensor device logic 332b may also include logic to convert information captured by the image capture devices and/or range finding devices into two-dimensional and/or three-dimensional information or data, for example two dimension and/or three-dimensional models of objects such as workpieces 108 (FIGS. 1A, 1B). In particular, the sensor device logic 332b may include image processing or machine-vision logic to extract features from image data captured by one or more image capture devices 114 into two or three-dimensional information, data or models. The robotic subsystem logic 332c may include logic or instructions to convert three-dimensional pose estimations into drive signals to control the robotic subsystem 104 (FIG. 1) or to provide appropriate information (e.g., transformations) to suitable drivers of the robotic subsystem 104. As discussed in detail below, the redistribution subsystem logic 332d may include logic or instructions to determine a preferred action (e.g., action type, action axes and/or action direction) from a plurality of different possible non-object picking actions that cause movement of the objects such as workpieces 108 in the area, without physically picking any of the objects, based on computational analysis of the acquired image. For example, the redistribution subsystem logic 332d may select an action to disperse the one or more clusters of the objects such as workpieces 108, from a plurality of different possible actions that do not physically remove any of the objects from the area, based at least in part on a characteristic of the identified one or more clusters, for instance an upper surface level of the objects or workpieces 108, a characteristic of the workpieces and/or a characteristic of the container 123 or support structure 122.

The system memory 308 may also include communications programs 340, for example a server and/or a Web client or browser for permitting the control subsystem 304 to access and exchange data with other systems such as user computing systems 122, Web sites on the Internet, corporate intranets, or other networks as described below. The communications programs 340 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 3 as being stored in the system memory 308, the operating system 330, application programs 332, other programs/modules 334, drivers 336, program data 338 and server and/or browser 340 can be stored on the hard disk 320 of the hard disk drive 318, the optical disk 326 of the optical disk drive 322 and/or the magnetic disk 328 of the magnetic disk drive 324. A user can enter commands and information into the control subsystem 304 through input devices such as a touch screen or keyboard 342 and/or a pointing device such as a mouse 344. Other input devices can include a microphone, joystick, game pad, tablet, scanner, biometric scanning device, etc. These and other input devices are connected to the processing unit 306 through an interface 346 such as a universal serial bus ("USB") interface that couples to the system bus 310, although other interfaces such as a parallel port, a game port or a wireless interface or a serial port may be used. A monitor 348 or other display device is coupled to the system bus 310 via a video interface 350, such as a video adapter. Although not shown, the control subsystem 304 can include other output devices, such as speakers, printers, etc.

The control subsystem 304 operates in a networked environment using one or more of the logical connections to communicate with one or more remote computers, servers and/or devices via one or more communications channels, for example, one or more networks 314a, 314b. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the control subsystem 304 may include a modem 354 for establishing communications over the WAN, for instance the Internet 314a. The modem 354 is shown in FIG. 3 as communicatively linked between the interface 346 and the Internet 314a. Additionally or alternatively, another device, such as a network port 356, that is communicatively linked to the system bus 310, may be used for establishing communications over the Internet 314a. Further, one or more network interfaces 352a-352d, that are communicatively linked to the system bus 310, may be used for establishing communications over a LAN 314b. In particular, a sensor interface 352a may provide communications with a sensor subsystem (e.g., sensor subsystem 102 of FIG. 1. A robot interface 352b may provide communications with a robotic subsystem (e.g., robotic system 104 of FIG. 1). A lighting interface 352c may provide communications with specific lights or a lighting system (not illustrated). A teaching pendant interface 352d may provide communications with a robot control terminal 130.

In a networked environment, program modules, application programs, or data, or portions thereof, can be stored in a server computing system (not shown). Those skilled in the relevant art will recognize that the network connections shown in FIG. 3 are only some examples of ways of establishing communications between computers, and other connections may be used, including wirelessly.

For convenience, the processing unit 306, system memory 308, network port 356 and interfaces 346, 352a-352d are illustrated as communicatively coupled to each other via the system bus 310, thereby providing connectivity between the above-described components. In alternative embodiments of the control subsystem 304, the above-described components may be communicatively coupled in a different manner than illustrated in FIG. 3. For example, one or more of the above-described components may be directly coupled to other components, or may be coupled to each other, via intermediary components (not shown). In some embodiments, system bus 310 is omitted and the components are coupled directly to each other using suitable connections.

Operation of an exemplary embodiment of the machine-vision based system 100 will now be described in greater detail. While reference is made throughout the following discuss to the embodiment of FIG. 1, the method may be employed with the other described embodiments, as well as even other embodiments, with or without modification.

Figure 4:
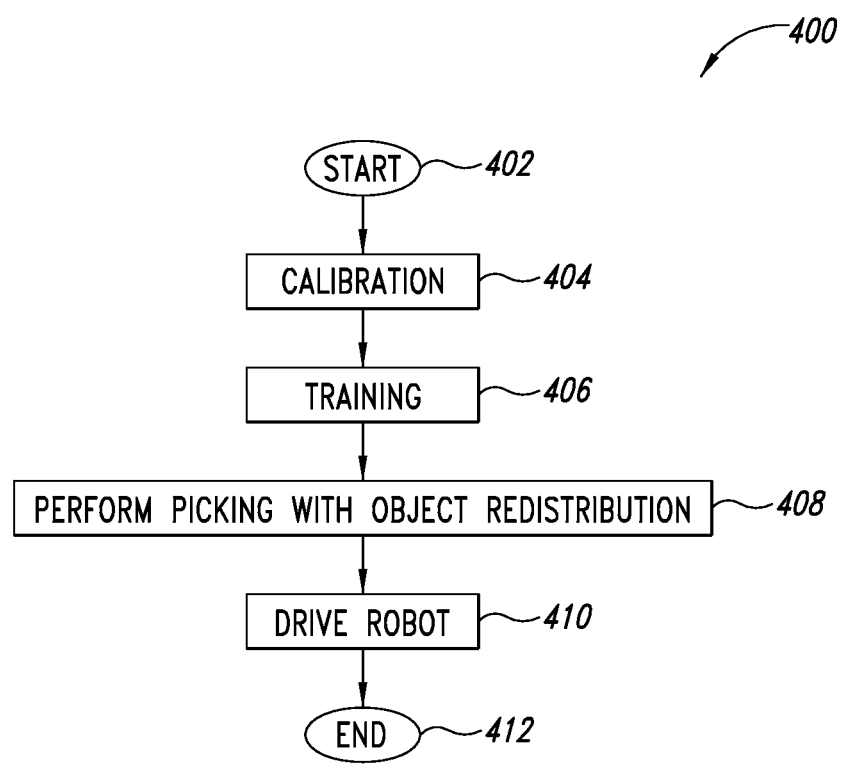
FIG. 4 is a high level flow diagram showing a method of operating an image based robotic cell to pick or otherwise remove workpieces such as parts or other objects, according to one illustrated embodiment.

FIG. 4 shows a method 400 of operating a machine-vision based robotic cell 100a, 100b (collectively 100) to pick or otherwise remove workpieces 108 such as parts or other objects, according to one illustrated embodiment.

The method 400 starts at 402. The method 400 may start, for example, when power is supplied to the machine-vision based robotic cell 100 or in response to activation by a user or by an external system, for example the robotic system 102.

At 404, the machine-vision based robotic cell 100 and in particular the vision system 110 are calibrated in a setup mode or time. The setup mode or time typically occurs before a training mode or time, and before a runtime or runtime mode. The calibration 404 may include intrinsic and/or extrinsic calibration of image acquisition devices, for example cameras 112 as well as calibration of range finding devices (not shown) and/or lighting (not shown). The calibration 404 may include any one or more of a variety of acts or operations.

For example, intrinsic calibration may be performed for all the image acquisition devices, and may involve the determination of the internal parameters such as focal length, image sensor center and distortion factors. An explanation of the preferred calibration algorithms and descriptions of the variables to be calculated can be found in commonly assigned U.S. Pat. No. 6,816,755 issued on Nov. 9, 2004, and pending application Ser. Nos. 10/634,874 and 11/183,228. The method 400 may employ any of the many other known techniques for performing the intrinsic calibration. In some embodiments, the intrinsic calibration of the cameras 112 may be performed before installation in the field. In such situations, the calibration data is stored and provided for each camera 112. It is also possible to use typical internal parameters for a specific image sensor, for example parameters associate with particular camera model-lens combinations. Where a pair of cameras 112 are in a stereo configuration, camera-to-camera calibration may be performed.

For example, extrinsic calibration may be preformed by determining the pose of one or more of the cameras 112. For example, one of the cameras 112 may be calibrated relative to a robotic coordinate system, while the other cameras 112 are not calibrated. Through extrinsic calibration the relationship (i.e., three-dimensional transformation) between an image acquisition device or camera coordinate reference frame and an external coordinate system (e.g., robotic system coordinate reference system) is determined, for example by computation. In at least one embodiment, extrinsic calibration is performed for at least one camera 112 to a preferred reference coordinate frame, typically that of the robotic system 104. An explanation of some extrinsic calibration algorithms and descriptions of the variables to be calculated can be found in commonly assigned U.S. Pat. No. 6,816,755, issued Nov. 9, 2004; U.S. Pat. No. 7,336,814, issued Feb. 26, 2008; and in commonly assigned pending applications U.S. Ser. No. 10/634,874, filed Aug. 6, 2003 and published as U.S. patent application Publication No. 2004-0172164; U.S. Ser. No. 11/534,578, filed Sep. 22, 2006 and published as U.S. patent application Publication No. 2007-0073439; U.S. Ser. No. 11/957,258, filed Dec. 14, 2007; U.S. Ser. No. 11/779,812, filed Jul. 18, 2007; U.S. patent application Publication No. 2007-0276539; U.S. patent application Publication No. 2008-0069435; U.S. Ser. No. 11/833,187, filed Aug. 2, 2007 U.S. Ser. No. 60/971,490, filed Sep. 11, 2007. The method may employ any of the many other known techniques for performing the extrinsic calibration.

Some embodiments may omit extrinsic calibration of the image acquisition devices, for example where the method 400 is employed only to create a comprehensive object model without driving the robotic system 104.

At 406, the machine-vision based robotic cell 100 is trained in a training mode or time. In particular, the machine-vision based robotic cell 100 is trained to recognize training objects or workpieces 108 (FIGS. 1A, 1B), for example parts 110. Training refers to the process whereby a training, sample, or reference object (e.g., object or workpiece 108 (FIGS. 1A, 1B) and its attributes are introduced to the machine-vision system 100. During the training process, various views of the training object are captured or acquired and various landmark features are selected whose geometrical properties are determined and stored. In some embodiments the views may be stored along with sparse model information, while in other embodiments feature information extracted from the views may be stored along with the sparse model information. Additionally, other training may occur. For instance, views of the container 123 or upper surface of the support structure 122 may be captured during training of the machine-vision system 100. Such may allow the specific geometry of the container or support surface to be considered as part of determining which non-picking action to employ (i.e., preferred non-picking action). Such may also train the machine-vision system 100 with respect to the location of the container or support surface. One exemplary method of training is discussed in commonly assigned U.S. patent application Ser. No. 11/833,187, filed Aug. 2, 2007, although other training methods may be employed.

At 408, the machine-vision based robotic cell 100 performs picking with object or workpiece redistribution at runtime or in a runtime mode. Such may include three-dimensional pose estimation, determination or selection of an action to redistribute the objects or workpieces 108 (FIGS. 1A, 1B) without picking or removing the objects or workpieces, as well as determination of a picking action to pick or remove objects or workpieces that appear to be accessible by the robotic system 104.

In some embodiments, the machine-vision based robotic cell 100 may employ reference two-dimensional information or models to identify object regions in an image, and may employ reference three-dimensional information or models to determine a three-dimensional pose of an object represented in the object region. The three-dimensional pose of the object may be determined based on at least one of a plurality of reference three-dimensional models of the object and a runtime three-dimensional representation of the object region where a point-to-point relationship between the reference three-dimensional models of the object and the runtime three-dimensional representation of the object region is not necessarily previously known. Other methods of pose estimation may be employed.

The results of the pose estimation may be used to determine whether any objects or workpieces are accessible by the robotic system 104 (FIGS. 1A, 1B). For example, the analysis or results may indicate that no or relatively few objects or workpieces are accessible, indicating that the objects or workpieces should be redistributed. Also for example, the analysis or results may indicate that an upper surface of the collection of objects or workpieces is not optimal for performing picking operations, indicating that the objects or workpieces should be redistributed. For instance, the analysis or results may indicate that the upper surface across the collection of objects or workpieces is too non-uniform. Also for example, the analysis or results may indicate that the objects or workpieces are too clustered for performing picking operations, indicating that the objects or workpieces should be redistributed.

Optionally, at 410 the machine-vision based robotic cell 100 drives the robotic system 104. For example, the machine-vision based robotic cell 100 may provide control signals to the robotic system 104 (FIGS. 1A, 1B) or to an intermediary robotic system controller to cause the robotic system 104 to move from one pose to another pose. The signals may, for example, encode a transformation, an may be electrical currents, voltages, optical, acoustic, radio or microwave wireless transmissions or the like (RF), etc.

The method 400 terminates at 412. The method 400 may terminate, for example, in response to a disabling of the machine-vision based robotic cell 100 by a user, the interruption of power, or an absence of objects or workpieces 108 in an image of the area (e.g., support structure 122 or container 123). Further details on the method 400 are disclosed in U.S. patent application Ser. No. 11/833,187, filed Aug. 2, 2007.

FIG. 5 shows a method 500 of operating an image based robotic cell 100, according to one illustrated embodiment. The method 500 may be useful in performing picking with object or workpiece redistribution 408 (FIG. 4).

At 502, one or more image acquisition devices, for example cameras 112, acquire an image of an area in which a plurality of workpieces 108 such as parts or other objects may reside. The image acquisition devices may be fixed, or moveable, may be mono or stereo.

At 504, an element of the robotic cell 100, for example the vision controller 118, computationally analyzes the acquired image for a respective representation of any of the objects or workpieces 108. Any of the many different approaches for recognizing objects in an image may be employed. For example, registration techniques may be employed, for instance registration of one surface with respect to another surface. Uniformity may be employed. Two- or three-dimensional pose estimation may be employed. Other standard feature recognition techniques may be employed, for instance more rudimentary machine-vision techniques that pose estimation.

At 506, an element of the robotic cell 100, for example the vision controller 118 or redistribution controller 126, determines whether to cause a movement or redistribution of objects or workpieces 108 based on the computational analysis of the acquired image. For example, the redistribution controller 126 may determine whether any objects or workpieces 108 appear to be accessible by the robot 104, whether an upper surface level of the collection of objects or workpieces meet some criteria (e.g., a level of uniformity), and/or whether there are clusters of objects or workpieces 108 that might hinder picking actions or operations.

At 508, an element of the robotic cell 100, for example the vision controller 118 or redistribution controller 126, computationally determines a preferred action from a plurality of different possible non-object picking actions that cause movement of the objects in the area, if any, without physically picking any of the objects. The determination may be based on the computational analysis of the acquired image. Thus, by using image data, the robotic cell 100 determines a particular redistribution action (e.g., action type, action axes and/or action direction) that will likely lead to exposure of one or more objects or workpieces 108 to the robot 104.

At 510, an element of the robotic cell 100, for example the redistribution controller 126, communicatively transmits at least one signal to cause the determined preferred action to occur. For example, the redistribution controller 126 may transmit one or more signals to the redistribution mechanism 121a or a component thereof (FIG. 1A). Also for example, the redistribution controller 126 may transmit one or more signals to the robot 104 (FIG. 1B). Also for example, the redistribution controller 126 may transmit one or more signals to the redistribution mechanism 200a (FIG. 2A), redistribution mechanism 200b (FIG. 2B) and/or redistribution mechanism 200c (FIG. 2C).

FIG. 6 shows a method 600 of operating an image based robotic cell 100, according to one illustrated embodiment. The method 600 may be useful in determining whether to cause movement of object(s) or workpiece(s) based on computational analysis of an acquired image 506 (FIG. 5).

At 602, an element of the robotic cell 100, for example the redistribution controller 126, determines from the acquired image whether any of the objects or workpieces 108 are currently positioned for engagement by a robot member without causing the movement. A picking action without a redistribution action may be triggered where one or more objects or workpieces 108 are determined to be accessible by the robot 104, while a redistribution action may be triggered where none or not enough of the objects or workpieces 108 are determined to be accessible by the robot 104.

FIG. 7 shows a method 700 of operating an image based robotic cell 100, according to one illustrated embodiment. The method 700 may be useful in determining whether to cause movement of object(s) or workpiece(s) based on computational analysis of an acquired image 506 (FIG. 5).

At 702, an element of the robotic cell, for example the redistribution controller 126, determines whether an upper surface level of the collection of objects or workpieces 108 is within a defined threshold of uniformity across at least a portion of the area. Such determination is based on the acquired image. In many instances, a uniform upper surface level facilitates picking operations, although in certain situations, a non-uniform upper surface level may be desirable. Thus, in some embodiments a sufficiently uniform upper surface level triggers a picking action without a redistribution action, while an upper surface level that is not sufficiently uniform triggers a redistribution action. Other embodiments may employ an opposite approach, trigger a picking operation when sufficiently non-uniform and a redistribution operation when the upper surface level is too uniform.

FIG. 8 shows a method 800 of operating an image based robotic cell 100, according to one illustrated embodiment. The method 800 may be useful in determining whether to cause movement of object(s) or workpiece(s) 108 based on computational analysis of an acquired image 506 (FIG. 5).

At 802, an element of the robotic cell 100, for example the redistribution controller 126, computationally determines whether at least one representation of at least one object or workpiece 108 appears in the acquired image and whether the representation of the at least one object or workpiece in the image indicates that a robot 104 is capable of physically engaging the at least one object or workpiece 108. Redistribution is indicated if the robot 104 is not capable of engaging one or more objects or workpieces, and a picking operation indicated if the robot 104 is capable of engaging the one or more objects or workpieces 108. Various thresholds may be employed. For example, some embodiments may employ a threshold requiring that at least one object or workpiece 108 is determined to be accessible by the robot 104 to trigger a picking action without a redistribution action, while other embodiments may require a larger number of objects or workpieces 108 to be determined to be accessible by the robot 104 in order to trigger a picking action without a redistribution action.

FIG. 9 shows a method 900 of operating an image based robotic cell 100, according to one illustrated embodiment. The method 900 may be useful in determining a preferred action from different possible non-object picking actions based on the computational analysis of the acquired image 508 (FIG. 5).

At 902, an element of the robotic cell 100, for example the redistribution controller 126, determines which of the different possible non-object picking actions has a highest likelihood of exposing at least one of the objects. The determination 902 employs the analysis of the acquired image to select among a variety of redistribution actions, for example selecting an action type (e.g., shaking, tilting, spinning, pivoting, sweeping, grading, blowing), an action axis (e.g., an axis of translation, an axis of rotation or pivoting) and/or an action direction (e.g., a direction of translation and/or a direction of rotation or pivoting). For instance, the analysis may indicate the objects or 108 workpieces are collected or clustered in one portion of the container 123. Such may indicate that a tilting of the container in the opposite direction will more evenly redistribute the objects or workpieces 108. Also for instance, the analysis may indicate that the objects or workpieces are highly interlocked or jumbled and a shaking type action is mostly likely to free the objects or workpieces 108 from each other and hence redistribute the objects or workpieces 108. Various other combinations of situations and corresponding redistribution actions will be apparent to those of skill in the art. Such combinations may be defined, for example in a table or as a set of records stored in a processor-readable storage device such a RAM or ROM.

Figure 10:
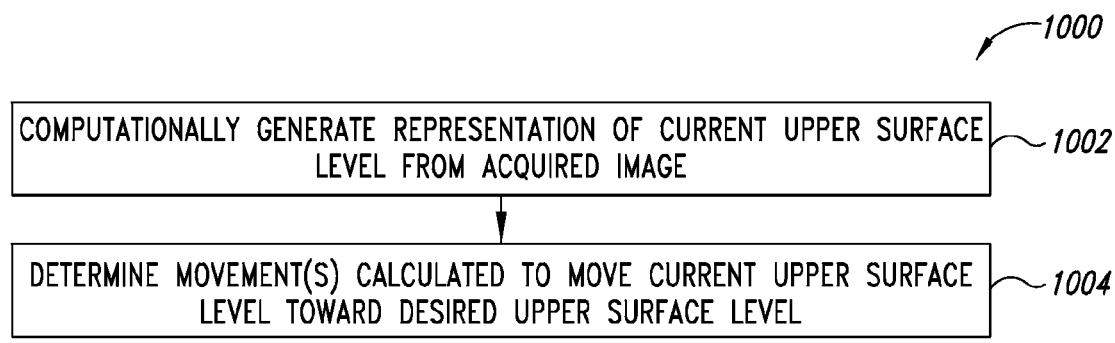
FIG. 10 is a flow diagram showing a method of operating an image based robotic cell to determine which of the different possible non-object picking actions has a highest likelihood of exposing at least one of the objects or workpieces, according to one illustrated embodiment.

FIG. 10 shows a method 1000 of operating an image based robotic cell 100, according to one illustrated embodiment. The method 1000 may be useful in determining which of the different possible non-object picking actions has a highest likelihood of exposing at least one of the objects 902 (FIG. 9).

At 1002, an element of the robotic cell 100, for example the redistribution controller 126, computationally generates a representation of a current upper surface level of the objects or workpieces 108 from the acquired image. At 1004, an element of the robotic cell 100, for example the redistribution controller 126, determines at least one movement calculated to move the current upper surface level toward a desired upper surface level. For example, the redistribution controller 126 may select an action type (e.g., shaking, tilting, spinning, pivoting, sweeping, grading, blowing), an action axis (e.g., an axis of translation, an axis of rotation or pivoting) and/or an action direction (e.g., a direction of translation, a direction of rotation or pivoting) based on the current distribution of objects or workpieces 108 indicated by analysis of the acquired image.

Figure 11:
FIG. 11 is a flow diagram showing a method of operating an image based robotic cell to determine which of the different possible non-object picking actions has a highest likelihood of exposing at least one of the objects or workpieces, according to another illustrated embodiment.

FIG. 11 shows a method 1100 of operating an image based robotic cell 100, according to one illustrated embodiment. The method 1100 may be useful in determining which of the different possible non-object picking actions has a highest likelihood of exposing at least one of the objects 902 (FIG. 9).

At 1102, an element of the robotic cell 100, for example the redistribution controller 126, determines which of the different possible non-object picking actions has a highest likelihood of distributing the objects to achieve a more uniform upper surface level. For example, the redistribution controller 126 may select an action type (e.g., shaking, tilting, spinning, pivoting, sweeping, grading, blowing), an action axis (e.g., an axis of translation, an axis of rotation or pivoting) and/or an action direction (e.g., a direction of translation or direction of rotation or pivoting) based on the current distribution of objects or workpieces 108 indicated by analysis of the acquired image.

Figure 12:
FIG. 12 is a flow diagram showing a method of operating an image based robotic cell to determine which of the different possible non-object picking actions has a highest likelihood of exposing at least one of the objects or workpieces, according to yet another illustrated embodiment.

FIG. 12 shows a method 1200 of operating an image based robotic cell 100, according to one illustrated embodiment. The method 1200 may be useful in determining which of the different possible non-object picking actions has a highest likelihood of exposing at least one of the objects 902 (FIG. 9). determining at least one movement calculated to move the current upper surface level toward a desired upper surface level 1004 (FIG. 10), and/or determines which of the different possible non-object picking actions has a highest likelihood of distributing the objects to achieve a more uniform upper surface level 1102 (FIG. 11).

At 1202, an element of the robotic cell 100, for example the redistribution controller 126, determines an axis about and/or a direction in which to at least one of tilt, shake, spin, pivot the support structure 122 or container 123, sweep or grade the objects or workpieces 108, and/or to blow the objects or workpieces 108.

Figure 13:
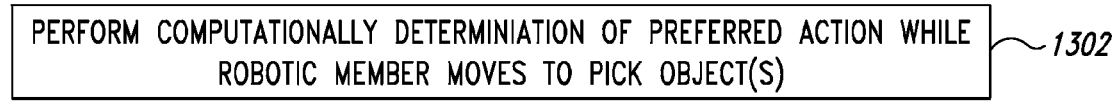
FIG. 13 is a flow diagram showing a method of operating an image based robotic cell that may be useful in the method of FIG. 5, according to one illustrated embodiment.

FIG. 13 shows a method 1300 of operating an image based robotic cell 100, according to one illustrated embodiment. The method 1300 may be useful in performing the method 500 (FIG. 5).

At 1302, one or more elements of the robotic cell 100, for example robot controller 106 and the redistribution controller 126, computationally determine a preferred action from a plurality of different possible non-object picking actions that cause movement of the objects in the area without physically picking any of the objects is preformed while a robotic member is moving to pick one of the objects. Such may advantageously greatly speed up operation of the robotic cell 100.

Figure 14:
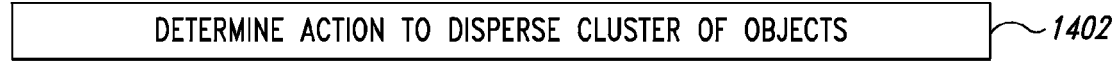
FIG. 14 is a flow diagram showing a method of operating an image based robotic cell to determine a preferred action from different possible non-object picking actions based on the computational analysis of the acquired image, according to one illustrated embodiment.

FIG. 14 shows a method 1400 of operating an image based robotic cell 100, according to one illustrated embodiment. The method 1400 may be useful in determining a preferred action from different possible non-object picking actions based on the computational analysis of the acquired image 508 (FIG. 5).

At 1402, an element of the robotic cell 100, for example the redistribution controller 126, determines an action to disperse one or more clusters of the objects or workpieces 108. For example, the redistribution controller 126 may select an action type (e.g., shaking, tilting, spinning, pivoting, sweeping, grading, blowing), an action axis (e.g., an axis of translation, an axis of rotation or pivoting) and/or an action direction (e.g., a direction of translation, direction of rotation or pivoting) based on the current distribution of objects or workpieces 108 indicated by analysis of the acquired image.

Figure 15:
FIG. 15 is a flow diagram showing a method of operating an image based robotic cell to transmit signals to cause the occurrence of the determined preferred action, according to one illustrated embodiment.

FIG. 15 shows a method 1500 of operating an image based robotic cell 100, according to one illustrated embodiment. The method 1500 may be useful in transmitting signals to cause the occurrence of the determined preferred action 510 (FIG. 5).

At 1502, an element of the robotic cell 100, for example the redistribution controller 126, communicatively transmits at least one signal to a redistribution mechanism. For instance, the redistribution controller 126 may transmit signals to an actuator (e.g., motors 124a, 124b, hydraulic pump, etc.) coupled to a move a support structure (e.g., table) 122 or container 123 on which the objects or workpieces 108 are carried. Also for example, the redistribution controller 126 may transmit signals to a robotic controller 106 that controls a robot 104 to move a support structure (e.g., table) 122 or container 123 on which the objects or workpieces 108 are carried. Also for example, the redistribution controller 126 may transmit signals to a robotic controller 106 that controls the robot 104 to directly physically engage the objects or workpieces 108. Also for example, the redistribution controller 126 may transmit signals to a robotic controller 106 or an auxiliary robot controller, to move a redistribution device 200a (FIG. 2A), 200C (FIG. 2C) to directly physically engage the objects or workpieces 108 or to move a redistribution device 200b (FIG. 2B) to move a support structure (e.g., table) 122 or container 123 on which the objects or workpieces 108 are carried.

FIG. 16 shows a method 1600 of operating an image based robotic cell 100, according to one illustrated embodiment. The method 1600 may be useful performing the method 500 (FIG. 5).

At 1602, an element of the robotic cell 100, for example the redistribution controller 126, performs a pose estimation for at least one of the objects based on the respective representation of the object in the acquired image. As described above, the pose estimation may take the form of two-dimensional (2D) or three-dimensional (3D) pose estimation, which may estimate a position and/or orientation of one or more objects or workpieces 108 is some coordinate frame (e.g., real world, robot space, camera space, etc.). A large variety of existing pose estimation algorithms may be suitable, as well as pose estimation algorithms developed in the future may be suitable.

The method 400 may further include engaging at least one of the objects with a robotic member and performing the desired action while the robotic member engages at least one of the objects. Such may be particularly useful in a variety of situations, for example where an object or workpiece 108 is particularly heavy or is a strange position or orientation. Thus, a give object or workpiece 108 may be held while the remaining objects or workpieces 108 are disturbed using a particular determined preferred non-picking action.

FIG. 17 shows a method 1700 of operating an image based robot cell 100, according to another illustrated embodiment.

At 1702, one or more image acquisition devices, for example cameras 112a-112c, repeatedly acquire images of an area in which a number of workpieces 108 such as parts or other objects may reside. The images may be acquired in analog or digital form, may be acquired as still images or moving images, may be acquired in a bitmap form or as video including any synchronization signals (e.g., via a frame grabber), etc., or may be acquired in any other format.

At 1704, an element of the robotic cell 100, for example the vision controller 118 or redistribution controller 126, computationally identifies one or more clusters of objects or workpieces 108 in the acquired images. The vision controller 118 or redistribution controller 126 may employ standard machine-vision techniques to identify clusters of objects or workpieces 108 in the acquired images.

At 1706, an element of the robotic cell 100, for example the redistribution controller 126, computationally selects an action to disperse the one or more clusters of the objects or workpieces 108 from a plurality of different possible actions without physically removing any of the objects from the area. The determination 1706 is based at least in part on a characteristic of the identified one or more clusters. The characteristic of the cluster may take a variety of forms, for example a height and/or uniformity of an upper surface level of the cluster(s), an amount of interlocking or jumbleness of the cluster(s). The determination 1706 may also employ characteristics of the objects or workpieces 108, for example the size of each object or workpieces 108, the geometry of each object or workpiece 108, the material properties (e.g., density, hardness, stickiness or adhesion, etc.) of each object or workpiece 108, etc. The determination 1706 may also employ characteristics of the area (e.g., support structure 122, bottom of container 123) on which the objects or workpieces 108 are carried. For example, the determination may employ a characteristic of a geometry of the area, for instance a size, depth and/or location of a well located in the container 123 and/or a corner of the container 123 in which workpieces 108 tend to collect.

At 1708, an element of the robotic cell 100, for example the redistribution controller 126, provides a signal that causes the selected redistribution action to occur.

As noted previously in reference to method 1500 (FIG. 15), the redistribution controller 126 may transmit signals to redistribution mechanisms 121a, 200a, 200b, 200c, other controllers (e.g., robot controller 106), and/or to robot 104 to cause the determined desired redistribution action to occur.

FIG. 18 shows a method 1800 of operating an image based robotic cell 100, according to one illustrated embodiment. The method 1800 may be useful in computationally selecting an action to disperse the one or more clusters of the objects or workpieces 108 from a plurality of different possible actions without physically removing any of the objects from the area 1706 (FIG. 17).

At 1802, an element of the robotic cell 100, for example the redistribution controller 126, computationally generates a representation of an upper surface level of the one or more clusters of objects from the acquired image.

Optionally at 1804, an element of the robotic cell 100, for example the redistribution controller 126, computationally determines a type of action that is likely to adjust the upper surface level of the one or more clusters toward a defined upper surface level. For example, the redistribution controller 126 may select one of tilting, shaking, spinning, sweeping, grading, or blowing type of action. At 1806, an element of the robotic cell 100, for example the redistribution controller 126, determines an action axis and/or action direction of movement to adjust the upper surface level of the one or more clusters toward a defined upper surface level. For example, the redistribution controller 126 may select an axis of translation, an axis of rotation or pivoting, a direction of translation and/or a direction of rotation or pivoting.

FIG. 19 shows a method 1900 of operating an image based system, according to one illustrated embodiment. The method 1900 may be performed in addition to or as part of the method 1700 (FIG. 17).

At 1902, the computational identification of one or more clusters 1704 (FIG. 17) and/or selection an action 1706 (FIG. 17) occurs while a robotic member is engaging at least one of the objects in response to the providing of signals 1708 (FIG. 17). Such may advantageously increase the throughput of the picking operations.

FIG. 20 shows a method 2000 of operating an image based robotic cell that may be useful in performing the method 400 (FIG. 4) or the method 1700 (FIG. 17), according to one illustrated embodiment.

At 2002, the image based system determine a preferred action (e.g., action type, action axes and/or action direction) from a plurality of different possible non-object picking actions that cause movement of the objects such as workpieces 108 in the area, without physically picking any of the objects, based on computational analysis of the acquired image, based at least in part on at least one of a geometry of a container 123 or surface of the support structure 122 that carries the workpieces 108, a size of the objects or workpieces 108 or a geometry of the objects or workpieces 108.

The geometry of the container 123 or surface of the support structure 122 may be defined via a representation (e.g., electronic or digital representation) of all or a portion of a bottom surface and/or sidewalls of the container 123 or upper surface of support structure 122. The container 123 or support structure 122 may, for example, include one or more wells or recesses (e.g., formed in a bottom surface of container 123 or upper surface of support structure 122), in which objects such as workpieces 108 (e.g., parts) tend to congregate. The container 123 or support structure 122 may, for example, additionally or alternatively, include one or more corners in which workpieces 108 tend to collect. The container 123 or support structure 122 may include any of a variety of other distinct geometric particularities. A knowledge of the specific geometry or volume of the container 123 or support structure 122 may be instructive in determining the preferred action, that will achieve the desired distribution of objects or workpieces 108 to facilitate a picking operation. For example, the determination may employ a characteristic of a geometry of the area, for instance a size, depth and/or location of a well located in the container 123 and/or a corner of the container 123 in which workpieces 108 tend to collect or overall volume of the container 123.

Likewise, the size and/or geometry of objects such as workpieces 108 (e.g., parts), may be defined via a representation (e.g., electronic or digital representation) of all or a portion of the objects. For example, the workpieces 108 may have portions that are likely to snag or interlock with each other. A knowledge of the specific size and/or geometry of the objects or workpieces 108 may be instructive in determining the preferred action, that will achieve the desired distribution of objects or workpieces 108 to facilitate a picking operation. For example, shaking may be desired where objects or workpieces 108 are highly likely to become interlocked or intertwined, or shaking followed by a tilting may be most desirable in such a situation.

Some embodiments may employ both a knowledge of the geometry of the container 123 or surface of the support structure 122, as well as a knowledge of the size and/or geometry of the objects or workpieces 108. For example, the objects or workpieces 108 may have portions that are likely to snag on certain portions of the container 123 or surface of the support structure 122. A knowledge of the specific size and/or geometry of the objects or workpieces 108, as well as the geometry of the container 123 or surface of the support structure 122 may be instructive in determining the preferred action, that will achieve the desired distribution of objects or workpieces 108 to facilitate a picking operation. For example, shaking at a particularly tilt angle may be desired where objects or workpieces 108 are highly likely to become interlocked or intertwined with a portion of the container.

While some embodiments may determine the preferred non-picking action based only on an upper surface level of the collection of the objects or workpieces 108 as explained above, other embodiments may additionally or alternatively employ information about a lower surface level (i.e., bottom surface of container 123 or the surface of support structure 122) and/or information about the specific objects or workpieces 108. For example, determination of the preferred non-picking action may be based on a volume between the upper surface (i.e., as defined by the collection of objects) and the lower surface (e.g., as defined by the bottom surface of the container 123 or the surface of the support structure 122 itself.) For instance, the determination may be based on total volume enclosed between the upper and lower surfaces, or may be based on how closely the upper surface conforms with the lower surface. In this respect, it is important to note that the upper surface of the collection of objects or workpieces 108 will typically not be very smooth or planar when considered on a scale that is approximately the same magnitude as the size of the objects or workpieces 108, particularly where the objects or workpieces 108 have highly irregular or non-symmetrical shapes or geometries. Thus, in embodiments that employ uniformity of surface level, the threshold may accommodate the variation inherent in the geometry of the objects or workpieces 108. Other embodiments, may employ size (e.g., thickness) of the collection of objects or workpieces 108 (e.g., distance between upper and lower surfaces), either at one or more specific locations, or as averaged over one or more specific areas or over an entire area of the container 123 or surface of the support structure 122.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other vision based systems, not necessarily the exemplary vision based robotic cells generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating an image based autonomous object repositioning system, the method comprising:
   acquiring data indicative of an image of an area in which a plurality of objects may reside using at least one image sensor;
   analyzing the acquired image data for data indicative of a respective representation of any of the objects using at least one processor communicably coupled to the at least one image sensor;
   based on the analysis of the acquired image data, determining by the at least one processor a preferred non-object picking physical output action from a plurality of different possible non-object picking physical output actions to cause the physical movement of the objects in the area, without physically picking any of the objects, the determining the preferred non-object picking physical output action based at least in part on a uniformity of height of the plurality of objects over the area;
   based on the analysis of the acquired image data, determining by the at least one processor a preferred axis or direction of the preferred non-object picking physical output action in which to tilt, shake, sweep or blow the objects in the area to expose at least one pickable object in the plurality of objects; and
   communicatively transmitting by the at least one processor at least one signal to one or more outputs capable of physically displacing at least a portion of the objects in the area to cause the determined preferred non-object picking physical output action to occur along the preferred axis or direction.

2. The method of claim 1, further comprising:
   based on the analysis of the acquired image data, determining by the at least one processor whether to cause movement of the objects in the area.

3. The method of claim 2 wherein determining by the at least one processor whether to cause movement of the objects in the area includes determining by the at least one processor whether any of the objects are currently positioned for engagement by a robot member without causing the movement.

4. The method of claim 2 wherein determining by the at least one processor whether to cause movement of the objects in the area includes determining whether an upper surface level of the objects is within a defined threshold across at least a portion of the area.

5. The method of claim 2 wherein determining by the at least one processor whether to cause movement of the objects in the area includes determining by the at least one processor whether data indicative of at least one object appears in the acquired image data and data indicative of at least one object in the acquired image data indicates that a robot member is capable of physically engaging the at least one object.

6. The method of claim 1 wherein determining by the at least one processor a preferred non-object picking physical output action from a plurality of different possible non-object picking physical output actions to cause the physical movement of the objects in the area without physically picking any of the objects includes determining by the at least one processor which of the different possible non-object picking physical output actions has a highest likelihood of exposing at least one of the objects.

7. The method of claim 1 wherein determining a preferred non-object picking physical output action from a plurality of different possible non-object picking physical output actions to cause the physical movement of the objects in the area without physically picking any of the objects includes generating by the at least one processor data indicative of a representation of a current upper surface level of the objects from the acquired image data, and determining at least one movement calculated to move the current upper surface level toward a desired upper surface level.

8. The method of claim 1 wherein determining a preferred non-object picking physical output action from a plurality of different possible non-object picking physical output actions to cause the physical movement the objects in the area without physically picking any of the objects includes determining which of the different possible non-object picking physical output actions has a highest likelihood of distributing the objects to achieve a more uniform upper surface level.

9. The method of claim 1 wherein determining a preferred non-object picking physical output action from a plurality of different possible non-object picking physical output actions to cause the physical movement of the objects in the area without physically picking any of the objects includes determining a preferred action based at least in part on at least one of a geometry of a container that carries the objects, a size of the objects or a geometry of the objects.

10. The method of claim 1 wherein analyzing the acquired image data for data indicative of a respective representation of any of the objects includes identifying a cluster of the objects and determining using the at least one processor a preferred non-object picking physical output action from a plurality of different possible non-object picking physical output actions that cause movement of the objects in the area without physically picking any of the objects includes determining an action to disperse the cluster of the objects.

11. The method of claim 1 wherein communicatively transmitting at least one signal to one or more outputs capable of physically moving the objects to cause the determined preferred non-object picking physical output action to occur along the preferred axis or direction includes transmitting the at least one signal to at least one of a robotic controller that controls a robotic arm or at least one actuator coupled to a move a table or container on which the objects are carried.

12. The method of claim 1 wherein analyzing the acquired image data for data indicative of a respective representation of any of the objects includes performing at least one of a feature recognition, a registration or a pose estimation for at least one of the objects based on the respective representation of the object in the acquired image.

13. An image based system, comprising:
at least one image acquisition device that acquires data indicative of an image of an area in which a plurality of objects may reside;
at least one processor; and
at least one processor-readable storage medium that stores processor executable instructions that cause the processor to:
analyze the acquired image data for data indicative of a respective representation of any of the objects;
based on the analysis of the acquired image data, determine a preferred action from a plurality of different possible non-object picking actions that cause movement of the objects in the area, if any, without physically picking any of the objects, the determining the preferred action based at least in part on a uniformity of height of the plurality of objects over the area;
based on the analysis of the acquired image data, determine a preferred axis or direction in which to tilt, shake, sweep or blow the objects to expose at least one pickable object in the plurality of objects; and
transmit at least one signal to cause the determined preferred action to occur.

14. The image based system of claim 13, further comprising:
at least one robot selectively positionable to physically pick at least one of the objects.

15. The image based system of claim 14 wherein the at least one robot is positionable to cause movement of the objects in accordance with the at least one signal.

16. The image based system of claim 14, further comprising:
a support structure on which the objects are carried; and
at least one actuator coupled to physically move the support structure in accordance with the at least one signal.

17. A method of operating an image based autonomous object repositioning system, the method comprising:
repeatedly acquiring data indicative of a number of images of an area in which a number of objects may reside using at least one image sensor;
identifying one or more clusters of the objects in the acquired image data using at least one processor communicably coupled to the at least one image sensor;
selecting by the at least one processor a preferred non-object picking physical output action to disperse the one or more clusters of the objects from a plurality of different possible non-object picking physical output actions without physically removing any of the objects or any of the one or more objects from the area or displacing any of the objects in the area, based at least in part on a characteristic of the identified one or more clusters and based at least in part on a uniformity of height of the number of objects over the area;
selecting by the at least one processor a preferred axis or direction in which to tilt, shake, sweep or blow the one or more clusters of objects to adjust the upper surface level of the one or more objects toward a defined upper surface level; and
providing a signal that causes the selected action.

18. The method of claim 17 wherein selecting by the at least one processor a preferred non-object picking physical output action to disperse the one or more clusters based at least in part on a characteristic of the identified one or more clusters includes generating data indicative of a representation of an upper surface level of the one or more clusters of objects from the acquired image data by the at least one processor, and determining by the at least one processor at least one direction or axis of movement to adjust the upper surface level of the one or more clusters toward a defined upper surface level.

19. The method of claim 17, further comprising:
engaging at least one of the objects with a robotic member; and
performing the desired action while the robotic member engages at least one of the objects.

20. The method of claim 17 wherein selecting by the at least one processor a preferred non-object picking physical output action to disperse the one or more clusters based at least in part on a characteristic of the identified one or more clusters includes determining by the at least one processor at least one direction or axis of movement based at least in part on at least one representation of at least one surface of a container or a support structure that carries the objects.

21. An image based system, comprising:
at least one image acquisition device that repeatedly acquires data indicative of an image of an area in which a plurality of objects may reside;
at least one processor; and
at least one processor-readable storage medium that stores processor executable instructions that cause the processor to:
identify one or more clusters of the objects in the acquired image data;
select a preferred non-object picking physical output action to disperse the one or more clusters of the objects from a plurality of different possible non-object picking physical output actions that do not physically remove any of the objects from the area, based at least in part on a characteristic of the identified one or more clusters and based at least in part on a uniformity of height of the plurality of objects over the area;
select a preferred axis or direction in which to tilt, shake, sweep or blow the one or more clusters of objects to disperse the one or more clusters of the objects based at least in part on a characteristic of the identified one or more clusters; and
provide a signal that causes the selected action.

22. The image based system of claim 21 wherein the instructions cause the processor to select a preferred non-object picking physical output action to disperse the one or more clusters based at least in part on a characteristic of the identified one or more clusters by generating a representation of an upper surface level of the one or more clusters of objects from the acquired image data, and determining at least one direction or axis of movement to adjust the upper surface level of the one or more clusters toward a defined upper surface level.

23. The image based system of claim 21, further comprising:
at least one robot selectively positionable to physically remove at least one of the objects from the area.

24. The image based system of claim 21 wherein the at least one robot is selectively positionable to cause movement of a support structure on which the one or more objects are carried, in accordance with the at least one signal.

25. The image based system of claim 21, further comprising:
 a support structure on which the objects are carried; and
 at least one actuator coupled to physically move the support structure in accordance with the at least one signal.

* * * * *